United States Patent
Okada et al.

(10) Patent No.: US 11,987,957 B2
(45) Date of Patent: May 21, 2024

(54) SHOVEL

(71) Applicant: SUMITOMO HEAVY INDUSTRIES, LTD., Tokyo (JP)

(72) Inventors: Junichi Okada, Kanagawa (JP); Keiji Honda, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 551 days.

(21) Appl. No.: 17/218,630

(22) Filed: Mar. 31, 2021

(65) Prior Publication Data
US 2021/0214919 A1  Jul. 15, 2021

Related U.S. Application Data

(63) Continuation of application No. PCT/JP2019/038523, filed on Sep. 30, 2019.

(30) Foreign Application Priority Data

Oct. 3, 2018 (JP) .................................. 2018-188454

(51) Int. Cl.
*E02F 9/22* (2006.01)

(52) U.S. Cl.
CPC ....... *E02F 9/2267* (2013.01); *B60W 2300/17* (2013.01)

(58) Field of Classification Search
CPC ..... B60W 2300/17; E02F 9/2267; E02F 3/32; E02F 3/435; E02F 3/437; E02F 9/205; E02F 9/2207; E02F 9/2296; E02F 9/24; E02F 9/265; E02F 9/2285; E02F 9/22; B60Y 2200/412

See application file for complete search history.

(56) References Cited

U.S. PATENT DOCUMENTS 5,048,296 A * 9/1991 Sunamura ............. E02F 9/2207
 60/468
5,620,053 A * 4/1997 Kamikawa ............ E02F 3/7618
 172/4

(Continued)

FOREIGN PATENT DOCUMENTS

CN 107882785 A * 4/2018 ................ E02F 9/22
CN 109469137 A * 3/2019 ................ E02F 3/42

(Continued)

OTHER PUBLICATIONS

"HEAP—The autonomous walking excavator;" Jud et al., Automation in Construction, vol. 129, Sep. 2021, 103783; Jun. 9, 2021. (Year: 2021).*

(Continued)

*Primary Examiner* — Khoi H Tran
*Assistant Examiner* — Jorge O Peche
(74) *Attorney, Agent, or Firm* — IPUSA, PLLC

(57) ABSTRACT

A shovel includes a lower traveling structure, an upper swing structure swingably mounted on the lower traveling structure, an attachment, and processing circuitry. The attachment includes a boom attached to the upper swing structure, an arm attached to the distal end of the boom, and an end attachment attached to the distal end of the arm. The processing circuitry is configured to automatically move the attachment in such a manner as to relatively reduce the movement of the attachment.

9 Claims, 14 Drawing Sheets

(56) References Cited

U.S. PATENT DOCUMENTS

| | | | | |
|---|---|---|---|---|
| 5,692,377 | A * | 12/1997 | Moriya | E02F 9/2242 60/427 |
| 6,129,158 | A * | 10/2000 | Yamamoto | E02F 9/2292 172/812 |
| 6,171,030 | B1 * | 1/2001 | Miyake | E02F 9/2296 405/303 |
| 6,467,264 | B1 * | 10/2002 | Stephenson | F15B 11/16 60/368 |
| 7,278,262 | B2 * | 10/2007 | Moon | F15B 21/087 60/426 |
| 7,451,685 | B2 * | 11/2008 | Tabor | F15B 11/163 91/361 |
| 8,096,227 | B2 * | 1/2012 | Brickner | F15B 11/024 91/454 |
| 9,518,370 | B2 * | 12/2016 | Tsukamoto | E02F 3/435 |
| 10,233,613 | B2 * | 3/2019 | Honda | E02F 9/2217 |
| 10,344,783 | B2 * | 7/2019 | Wang | B66C 13/066 |
| 2002/0062587 | A1 * | 5/2002 | Kimoto | E02F 9/2275 37/466 |
| 2005/0144938 | A1 * | 7/2005 | Kajita | E02F 9/226 60/468 |
| 2005/0177292 | A1 * | 8/2005 | Okamura | E02F 9/2207 701/50 |
| 2007/0130933 | A1 * | 6/2007 | Yoshino | F15B 21/008 60/469 |
| 2011/0264337 | A1 * | 10/2011 | Takanashi | B60W 50/035 903/902 |
| 2014/0088839 | A1 * | 3/2014 | Magaki | E02F 9/2285 701/50 |
| 2014/0121840 | A1 | 5/2014 | Mizuochi et al. | |
| 2015/0284930 | A1 * | 10/2015 | Tsukamoto | E02F 3/32 701/50 |
| 2017/0016460 | A1 * | 1/2017 | Jung | E02F 9/2296 |
| 2017/0089033 | A1 * | 3/2017 | Matsuyama | E02F 9/2296 |
| 2017/0120820 | A1 * | 5/2017 | Petzold | E02F 9/261 |
| 2017/0204887 | A1 * | 7/2017 | Matsuzaki | F15B 21/14 |
| 2018/0171598 | A1 * | 6/2018 | Iwamura | E02F 3/435 |
| 2018/0298584 | A1 * | 10/2018 | Okada | B60K 28/16 |
| 2019/0017248 | A1 | 1/2019 | Okada et al. | |
| 2020/0115882 | A1 * | 4/2020 | Sano | E02F 9/2267 |
| 2020/0131734 | A1 * | 4/2020 | Maeda | E02F 9/2296 |
| 2020/0190770 | A1 * | 6/2020 | Nakajima | E02F 3/435 |
| 2020/0256034 | A1 * | 8/2020 | Yamamoto | E02F 9/2037 |
| 2020/0407945 | A1 * | 12/2020 | Okada | E02F 9/268 |
| 2021/0010239 | A1 * | 1/2021 | Ono | E02F 9/2012 |
| 2021/0230837 | A1 * | 7/2021 | Narikawa | E02F 9/2228 |
| 2021/0238814 | A1 * | 8/2021 | Engelmann | B62D 55/116 |
| 2022/0010519 | A1 * | 1/2022 | Izumikawa | E02F 9/262 |
| 2022/0018402 | A1 * | 1/2022 | Pryor | F16D 48/06 |
| 2022/0259817 | A1 * | 8/2022 | Hayashi | B60G 9/02 |
| 2022/0396932 | A1 * | 12/2022 | Fujio | E02F 3/964 |
| 2023/0078047 | A1 * | 3/2023 | Nishi | E02F 3/439 701/50 |

FOREIGN PATENT DOCUMENTS

| | | | | |
|---|---|---|---|---|
| EP | 722018 | A1 * | 7/1996 | E02F 9/2242 |
| GB | 2092104 | A * | 8/1982 | E02F 3/30 |
| JP | H05-202535 | | 8/1993 | |
| JP | H06108494 | A * | 4/1994 | |
| JP | H08-302753 | | 11/1996 | |
| JP | 3794771 | B2 * | 7/2006 | E02F 3/435 |
| JP | 2018091131 | A * | 6/2008 | E02F 3/439 |
| JP | 2009-256891 | | 11/2009 | |
| JP | 2010-151191 | | 7/2010 | |
| JP | 2014-122510 | | 7/2014 | |
| JP | 2016-113791 | | 6/2016 | |
| JP | 2016-172963 | | 9/2016 | |
| JP | 2018-091131 | | 6/2018 | |
| JP | 2022066469 | A * | 4/2022 | E02F 3/32 |
| JP | 7342018 | B2 * | 9/2023 | E02F 3/32 |
| KR | 100202203 | B1 * | 6/1999 | |
| KR | 20170106424 | A * | 9/2017 | |
| KR | 20210002211 | A * | 1/2021 | |
| WO | 2016/035898 | | 3/2016 | |
| WO | 2017/170555 | | 10/2017 | |
| WO | WO-2019182128 | A1 * | 9/2019 | E02F 3/435 |

OTHER PUBLICATIONS

"Path tracking for a hydraulic excavator utilizing proportional-derivative and linear quadratic control;" Kang et al., 2014 IEEE Conference on Control Applications (CCA) (pp. 808-813); Jan. 16, 2015. (Year: 2015).*

"An experimental study on Cartesian tracking control of automated excavator system using TDC-based robust control design;" Lee et al., Proceedings of the 1999 American Control Conference (Cat. No. 99CH36251) (vol. 5, pp. 3180-3185 vol. 5); Jan. 1, 1999. (Year: 1999).*

International Search Report for PCT/JP2019/038523 dated Dec. 17, 2019.

* cited by examiner

SHOVEL

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2019/038523, filed on Sep. 30, 2019 and designating the U.S., which claims priority to Japanese patent application No. 2018-188454, filed on Oct. 3, 2018. The entire contents of the foregoing applications are incorporated herein by reference.

BACKGROUND

Technical Field

The present invention relates to shovels.

Description of Related Art

A technique to automatically move the attachment of a shovel has been known.

According to the technique, instability phenomena such as a lift of the back of the machine body of a shovel are controlled by automatically correcting the movement of a boom by controlling (relieving) the pressure of the bottom-side oil chamber of a boom cylinder according to the movement of the shovel.

SUMMARY

According to an aspect of the present invention, a shovel includes a lower traveling structure, an upper swing structure swingably mounted on the lower traveling structure, an attachment, and processing circuitry. The attachment includes a boom attached to the upper swing structure, an arm attached to the distal end of the boom, and an end attachment attached to the distal end of the arm. The processing circuitry is configured to automatically move the attachment in such a manner as to relatively reduce the movement of the attachment.

DETAILED DESCRIPTION

Automatically moving the attachment of a shovel as described above may cause anxiety to an operator, workers around, etc., depending on its way of moving.

Therefore, it is desired to provide a technique that makes it possible to improve the safety of a shovel in the case of automatically moving the attachment.

According to an aspect of the present invention, it is possible to provide a technique that makes it possible to improve the safety of a shovel in the case of automatically moving the attachment.

An embodiment of the invention is described below with reference to the drawings.
[Shovel Overview]

Figure 1:
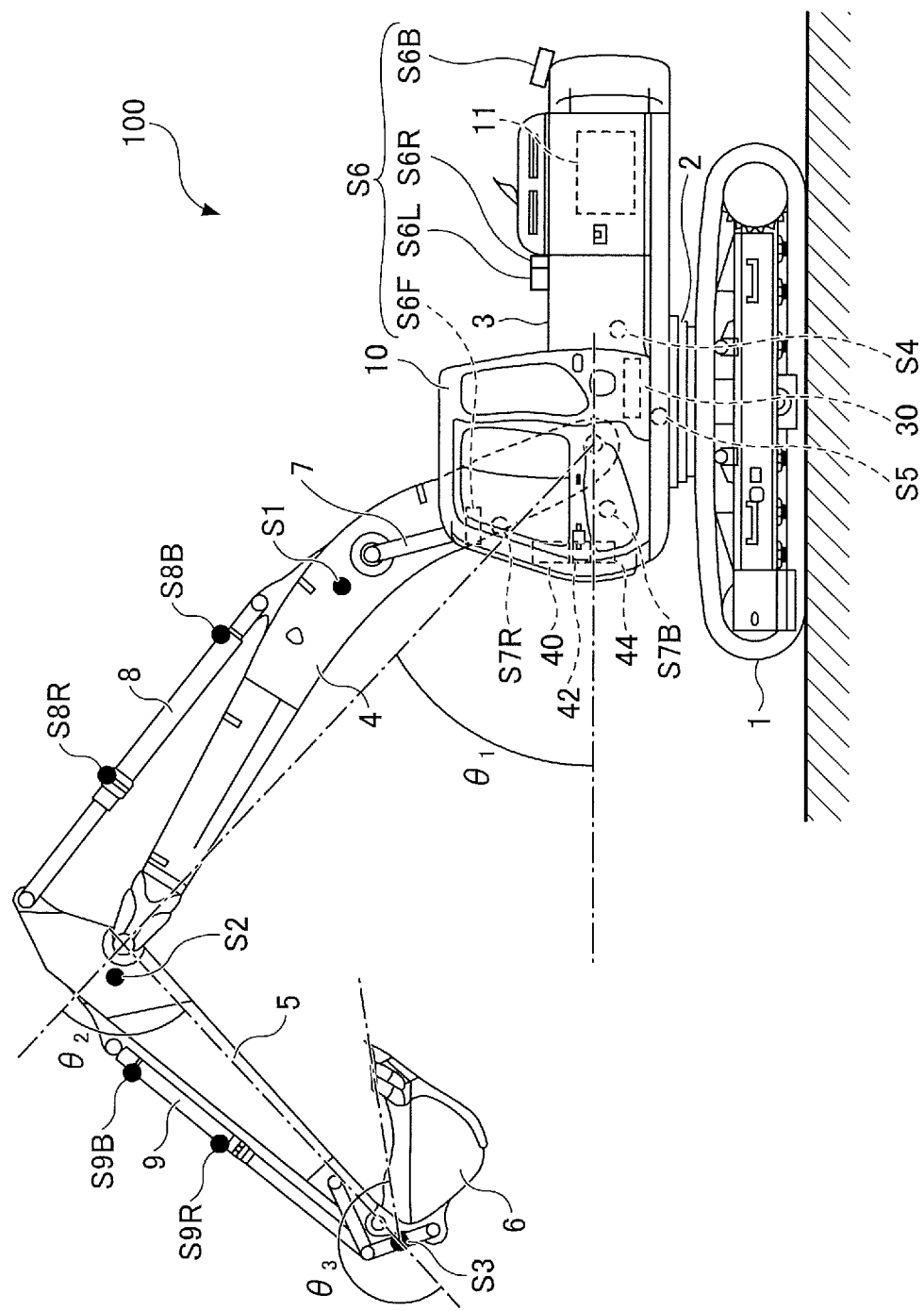
FIG. 1 is a side view illustrating an example of a shovel.

First, an overview of a shovel 100 according to this embodiment is given with reference to FIG. 1.

FIG. 1 is a side view of the shovel 100 according to this embodiment.

The shovel 100 according to this embodiment includes a lower traveling structure 1; an upper swing structure 3 swingably mounted on the lower traveling structure 1 via a swing mechanism 2; a boom 4, an arm 5, and a bucket 6 that serve as an attachment; and a cabin 10. In the following, the front side of the shovel 100 corresponds to a direction in which the attachment extends relative to the upper swing structure 3 (hereinafter simply referred to as "attachment extension direction") in a plan view looking at the shovel 100 from directly above along the swing axis of the upper swing structure 3 (hereinafter simply referred to as "plan view"). Furthermore, the left side and the right side of the shovel 100 correspond to the left side and the right side, respectively, of an operator in the cabin 10 in a plan view of the shovel 100.

The lower traveling structure 1 includes, for example, a pair of left and right crawlers, which are hydraulically driven by travel hydraulic motors 1L and 1R (see FIGS. 2 through 4), respectively, to cause the shovel 100 to travel.

The upper swing structure 3 is driven by a swing hydraulic motor 2A (see FIGS. 2 through 4) to swing relative to the lower traveling structure 1.

The boom 4 is pivotally attached to the front center of the upper swing structure to be able to rise and lower. The arm 5 is pivotally attached to the distal end of the boom 4 to be vertically pivotable. The bucket 6 is pivotally attached to the distal end of the arm 5 to be vertically pivotable. The boom 4, the arm 5, and the bucket 6 are hydraulically driven by a boom cylinder 7, an arm cylinder 8, and a bucket cylinder 9, respectively, which serve as hydraulic actuators.

The bucket 6 is an example of an end attachment. Different types of end attachments than the bucket 6 (for example, end attachments that are different in use from the bucket 6, such as a crusher and a lifting magnet, and end attachments that are different in specifications other than use from the bucket 6, such as a large bucket) may be attached to the shovel 100. That is, the shovel 100 may be configured such that the type of the end attachment may be suitably changed according to work details, etc.

The cabin 10 is a cab in which the operator rides, and is mounted on the front left of the upper swing structure 3.

The shovel 100 moves driven elements such as the lower traveling structure 1, the upper swing structure 3, the boom 4, the arm 5, and the bucket 6 in response to operations performed by the operator riding in the cabin 10 (hereinafter "riding operator" for convenience).

Furthermore, the shovel 100 may move driven elements such as the lower traveling structure 1, the upper swing structure 3, the boom 4, the arm 5, and the bucket 6 in response to a remote control signal received from a predetermined external apparatus (for example, a management apparatus 200 as described below). That is, the shovel 100 may be remotely controlled. When the shovel 100 is remotely controlled, there may be no one in the cabin 10.

Furthermore, the shovel 100 may automatically operate hydraulic actuators, independent of the details of an operation performed by the riding operator of the cabin or remote control performed by an operator of the external apparatus (hereinafter "remote operator" for convenience). With this, the shovel 100 implements the function of automatically moving at least one or more of driven elements such as the lower traveling structure 1, the upper swing structure 3, the boom 4, the arm 5, and the bucket 6 (hereinafter, "automatic operation function"). Hereinafter, the riding operator and the remote operator may be collectively referred to as "operator."

The automatic operation function may include the function of automatically operating a driven element (hydraulic actuator) other than an operated driven element (hydraulic actuator) in response to the riding operator's operation or the remote control of the remote operator (so-called "semi-automatic operation function"). Furthermore, the automatic operation function may also include the function of automatically operating at least one or more of driven elements (hydraulic actuators) without the riding operator's operation or the remote control of the remote operator (so-called "fully automatic operation function"). When the fully automatic operation function is enabled in the shovel 100, there may be no one in the cabin 10. Furthermore, the automatic operation function may include the function of the shovel 100 recognizing the gesture of a person such as a worker around the shovel 100 and automatically operating one or more of driven elements (hydraulic actuators) according to the details of the recognized gesture ("gesture operation function"). Furthermore, the semi-automatic operation function, the fully automatic operation function, and the gesture operation function may include a mode in which the operation details of a driven element (hydraulic actuator) to be automatically operated are automatically determined according to predetermined rules. Furthermore, the semi-automatic operation function, the fully automatic operation function, and the gesture operation function may include a mode in which the shovel 100 autonomously performs various determinations and the operation details of a driven element (hydraulic actuator) to be automatically operated are autonomously determined along the determination results (so-called "autonomous operation function").

[Shovel Configuration]

Next, a specific configuration of the shovel 100 is described with reference to FIGS. 2 through 5 in addition to FIG. 1.

Figure 2:
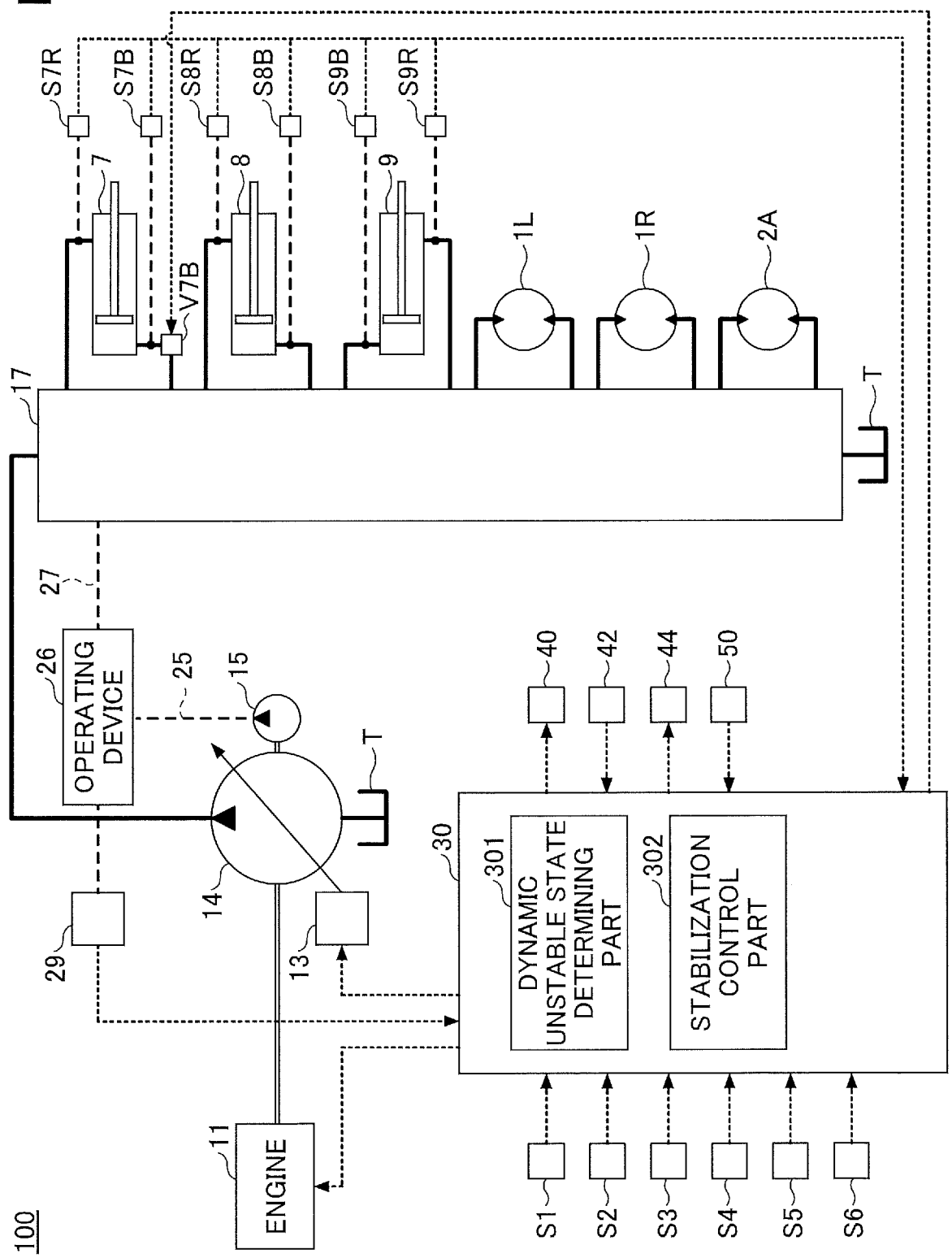
FIG. 2 is a block diagram illustrating an example configuration of the shovel.
Figure 3:
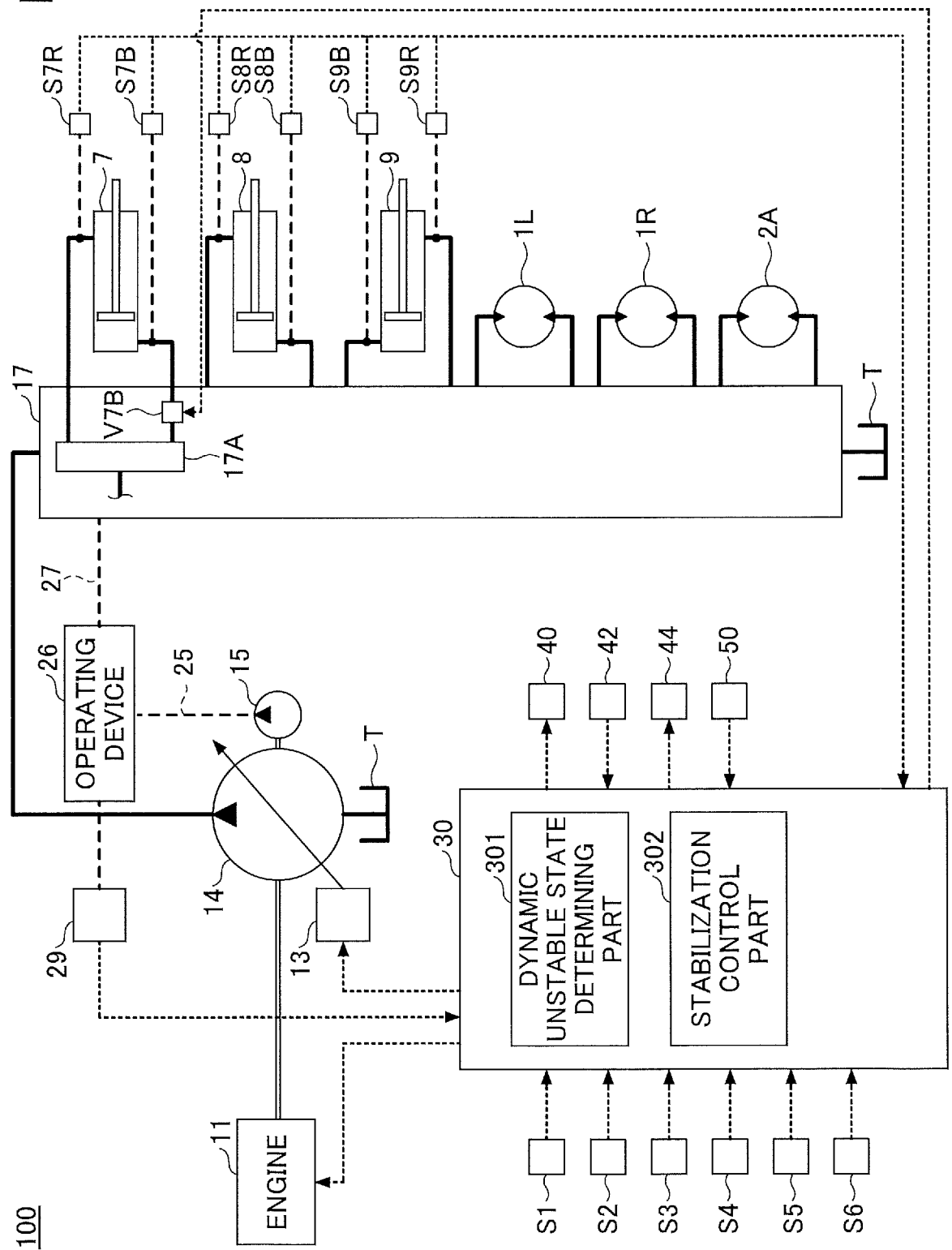
FIG. 3 is a block diagram illustrating another example configuration of the shovel.
Figure 4:
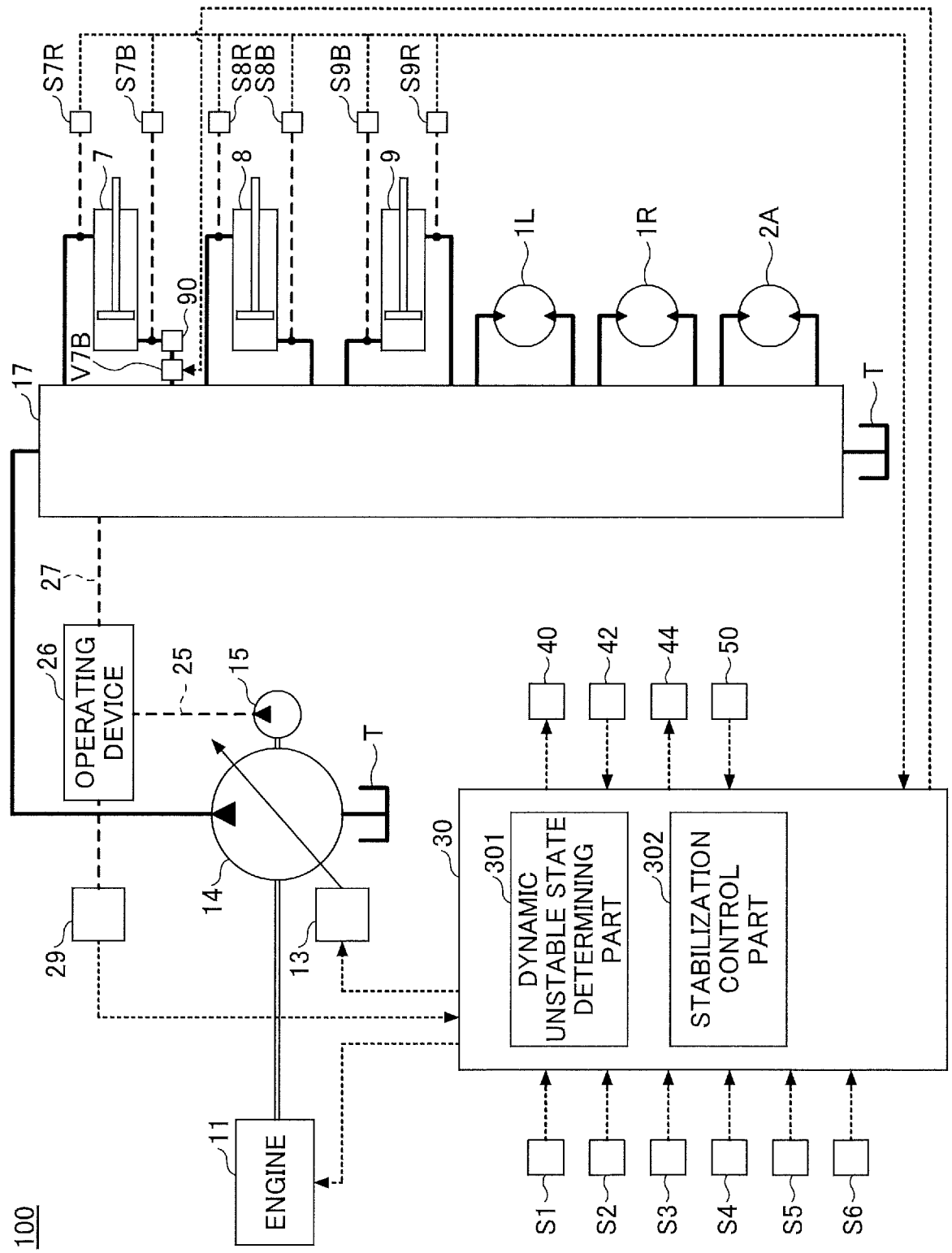
FIG. 4 is a block diagram illustrating yet another example configuration of the shovel.
Figure 5:
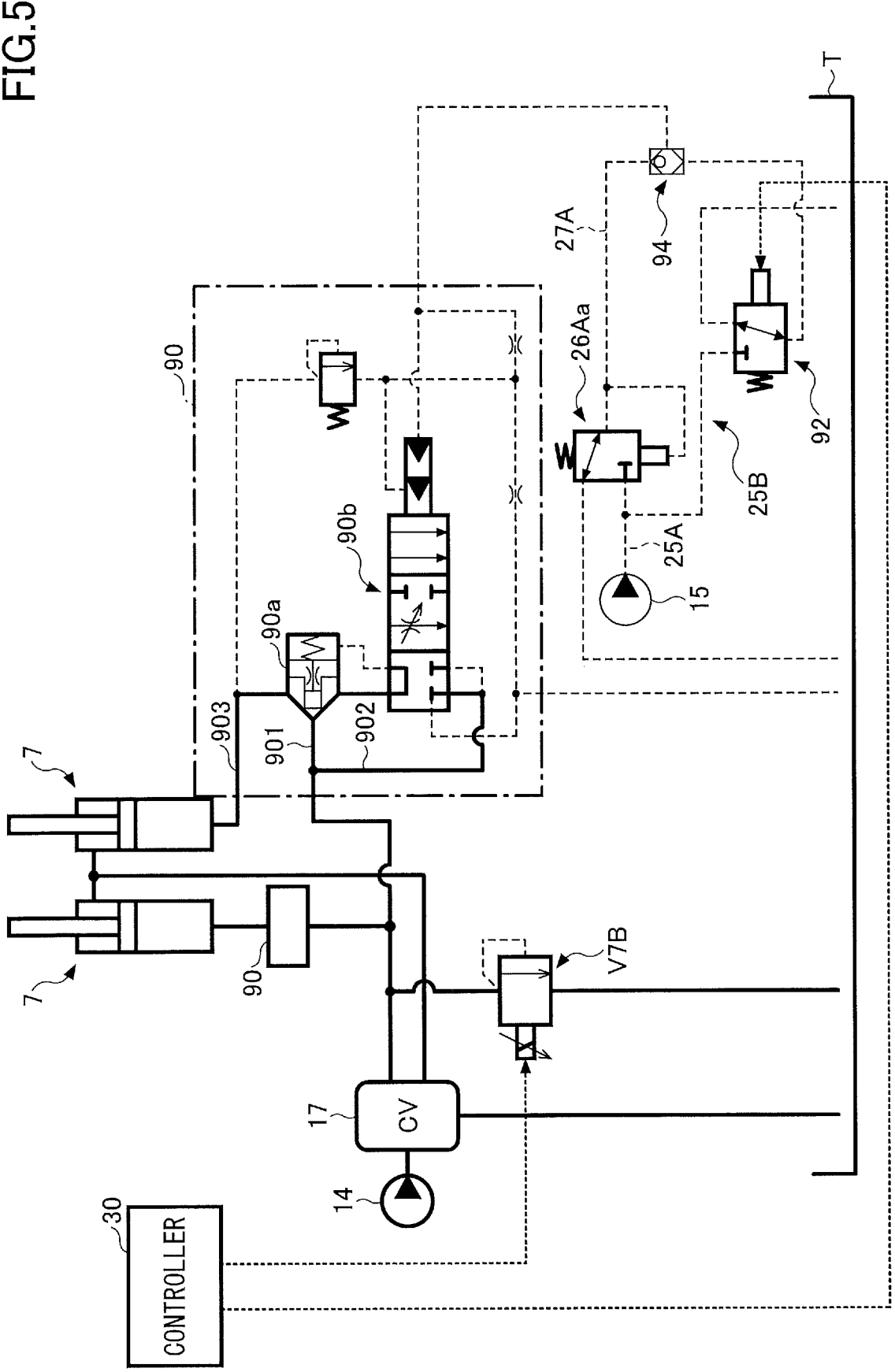
FIG. 5 is a diagram illustrating the details of a hydraulic circuit including a hydraulic oil retainer circuit and a relief valve.

FIGS. 2 through 4 are block diagrams illustrating an example, another example, and yet another example, respectively, of the configuration of the shovel 100 according to this embodiment. Specifically, FIGS. 2 through 4 differ from one another in the configuration of a hydraulic circuit related to a relief valve V7B described below. FIG. 5 is a diagram illustrating an example of a hydraulic circuit including a hydraulic oil retainer circuit 90 and the relief valve V7B, and is specifically a drawing illustrating a hydraulic circuit including the hydraulic oil retainer circuit 90 and the relief valve V7B corresponding to the configuration of the shovel 100 illustrated in FIG. 4.

In the drawings, a mechanical power line, a high-pressure hydraulic line, a pilot line, and an electric drive and control line are indicated by a double line, a solid line, a dashed line, and a dotted line, respectively.

The hydraulic drive system of the shovel 100 according to this embodiment includes hydraulic actuators such as the travel hydraulic motors 1L and 1R, the swing hydraulic motor 2A, the boom cylinder 7, the arm cylinder 8, and the bucket cylinder 9 that hydraulically drive the lower traveling structure 1, the upper swing structure 3, the boom 4, the arm 5, and the bucket 6, respectively, as described above. Furthermore, the hydraulic drive system of the shovel 100 according to this embodiment includes an engine 11, a regulator 13, a main pump 14, and a control valve 17.

The engine 11 is a main power source in the hydraulic drive system and is mounted on the back of the upper swing structure 3, for example. Specifically, the engine 11 rotates constantly at a preset target rotational speed under the direct or indirect control of a controller as described below to drive the main pump 14 and a pilot pump 15. The engine 11 is, for example, a diesel engine fueled with diesel fuel.

The regulator 13 controls the discharge quantity of the main pump 14. For example, the regulator 13 adjusts the angle (tilt angle) of the swash plate of the main pump 14 in response to a control command from the controller 30.

The main pump 14 is, for example, mounted on the back of the upper swing structure 3 the same as the engine 11, and supplies hydraulic oil to the control valve 17 through a high-pressure hydraulic line. As described above, the main pump 14 is driven by the engine 11. The main pump 14 is, for example, a variable displacement hydraulic pump. As described above, under the control of the controller 30, the tilt angle of the swash plate of the main pump 14 may be adjusted by the regulator 13 to adjust the stroke length of its piston, so that its discharge flow rate (discharge pressure) may be controlled.

The control valve 17 is a hydraulic control device that is mounted in the center of the upper swing structure 3 to control hydraulic actuators according to the riding operator's operation on an operating device 26 or remote control performed by the remote operator, for example. As described above, the control valve 17 is connected to the main pump 14 via a high-pressure hydraulic line to selectively supply hydraulic oil supplied from the main pump 14 to hydraulic actuators (the travel hydraulic motors 1L and 1R, the swing hydraulic motor 2A, the boom cylinder 7, the arm cylinder 8, and the bucket cylinder 9) in accordance with the operator's operations.

Specifically, the control valve 17 includes control valves (for example, a below-described control valve 17A that corresponds to the boom cylinder 7, etc.) that control the flow rate and the direction of flow of hydraulic oil supplied from the main pump 14 to the individual hydraulic actuators.

The operation system of the shovel 100 according to this embodiment includes the pilot pump 15 and the operating device 26.

The pilot pump 15 is, for example, mounted on the back of the upper swing structure 3 and supplies hydraulic oil (a pilot pressure) to the operating device 26 via a pilot line 25. The pilot pump 15 is, for example, a fixed displacement hydraulic pump and is driven by the engine 11 as described above.

The operating device 26 is provided near the operator seat of the cabin 10 and serves as an operation input part for the riding operator operating various moving elements (the lower traveling structure 1, the upper swing structure 3, the boom 4, the arm 5, the bucket 6, etc.). In other words, the operating device 26 is an operation input part for the riding operator operating hydraulic actuators (namely, the travel hydraulic motors 1L and 1R, the swing hydraulic motor 2A, the boom cylinder 7, the arm cylinder 8, the bucket cylinder 9, etc.) that drive corresponding moving elements.

As illustrated in FIGS. 2 through 4, the operating device 26 is, for example, of a hydraulic pilot type that uses hydraulic oil supplied from the pilot pump through the pilot line 25. The operating device 26 outputs a pilot pressure commensurate with the details of its operation to a pilot line 27 on its secondary side, using hydraulic oil supplied from the pilot pump 15. The operating device 26 is connected to the control valve 17 through the pilot line 27 on its secondary side. This causes pilot pressures commensurate with the operating states of the lower traveling structure 1, the upper swing structure 3, the boom 4, the arm 5, the bucket 6, etc., to be input to the control valve 17. Therefore, the control valve 17 can achieve the operations of corresponding hydraulic actuators according to the operating states at the operating device 26.

Furthermore, the operating device 26 may also be, for example, of an electric type that outputs an electrical signal corresponding to the operation details (hereinafter "operation signal"). The operation signal output from the operating device 26 is, for example, fed into the controller 30. The controller 30 outputs a control command corresponding to the operation details of the operating device 26 to a hydraulic control valve (hereinafter, "operation control valve") provided in a pilot line connecting the pilot pump 15 and a pilot port of the control valve 17, in response to the received operation signal. This causes a pilot pressure commensurate with the operation details of the operating device 26 to be supplied from the operation control valve to the control valve 17. Therefore, the control valve 17 can achieve the respective operations of hydraulic actuators corresponding to the details of operations performed on the operating device 26 by the riding operator or the like.

Furthermore, the operation control valve may also be used in the case where the shovel 100 is remotely controlled. For example, the controller 30 outputs a control command corresponding to the details of remote control to the operation control valve, in response to a remote control signal received from an external apparatus. This causes a pilot pressure commensurate with the details of remote control to be supplied from the operation control valve to the control valve 17. Therefore, the control valve 17 can achieve the operations of hydraulic actuators corresponding to the details of the remote operator's remote control. Furthermore, the operation control valve may also be used in the case where the shovel 100 has the automatic operation function. For example, the controller outputs a control command corresponding to the operation of a hydraulic actuator implemented by the automatic operation function, independent of the operator's operation. This causes a pilot pressure commensurate with the operation of the hydraulic actuator implemented by the automatic operation function to be supplied from the operation control valve to the control valve 17. Therefore, the control valve 17 can achieve the operations of hydraulic actuators corresponding to the automatic operation function.

The operating device 26 includes, for example, lever devices with which to operate the boom 4 (the boom cylinder 7), the arm 5 (the arm cylinder 8), the bucket 6 (the bucket cylinder 9), and the upper swing structure 3 (the swing hydraulic motor 2A). Furthermore, the operating device 26 includes, for example, pedal devices or lever devices with which to operate the left and right of the lower traveling structure 1 (the travel hydraulic motors 1L and 1R).

The control system of the shovel 100 according to this embodiment includes the controller 30, an operating pressure sensor 29, a display 40, an input device 42, an audio output device 44, a boom fall amount detector 50, a boom pose sensor S1, an arm pose sensor S2, a bucket pose sensor S3, a machine body tilt sensor S4, a boom bottom pressure sensor S7B, a boom rod pressure sensor S7R, an arm bottom pressure sensor S8B, an arm rod pressure sensor S8R, a bucket bottom pressure sensor S9B, a bucket rod pressure sensor S9R, and the relief valve V7B.

The controller 30 (an example of a control device) is processing circuitry that controls the driving of the shovel 100. The functions of the controller 30 may be implemented by desired hardware, a combination of hardware and software, or the like. For example, the controller 30 is constituted mainly of a computer that includes a CPU (Central Processing Unit), a memory unit such as a RAM (Random Access Memory), a non-volatile secondary storage such as a ROM (Read Only Memory), and various input/output interface devices.

For example, the controller 30 executes control related to the function of automatically moving the attachment (hereinafter "automatic attachment control function"). The automatic attachment control function includes, for example, a stabilization control function to automatically move the attachment to control predetermined instability phenomena (for example, a back lift phenomenon as described below) in the shovel 100. Furthermore, the automatic attachment control function includes an automatic operation function related to the attachment.

The controller 30 includes a dynamic unstable state determining part 301 and a stabilization control part 302 as functional parts related to the stabilization control function, implemented by, for example, executing, on the CPU, one or more programs installed in the non-volatile secondary storage or the like.

One or more of the functions of the controller 30 may be implemented by another controller (control device). That is, the functions of the controller 30 may be distributed among and implemented by multiple controllers.

As described above, the operating pressure sensor 29 detects the pilot pressure of the secondary side (the pilot line 27) of the operating device 26, that is, a pilot pressure corresponding to the operating state of each moving element (hydraulic actuator) at the operating device 26. Detection signals of pilot pressures corresponding to the operating states of the lower traveling structure 1, the upper swing structure 3, the boom 4, the arm 5, the bucket 6, etc., at the operating device 26 generated by the operating pressure sensor 29 are fed into the controller 30.

The display 40 is placed at such a position as to make it easy for the riding operator in the cabin 10 to look at the display 40, and displays various information images under the control of the controller 30. Examples of the display 40 include a liquid crystal display and an organic EL (Electroluminescence) display.

The input device 42 is provided within the reach of the riding operator seated in the cabin 10, and receives the riding operator's various operation inputs to output signals corresponding to the operation inputs to the controller 30. Examples of the input device 42 may include a touchscreen mounted on the display of a display unit that displays various information images, a knob switch provided at the top end of the lever portion of a lever device included in the operating device 26, and a button switch, a lever, a toggle, a dial, etc., installed around the display 40.

The audio output device 44 is provided in the cabin 10, and outputs various kinds of audio under the control of the controller 30. Examples of the audio output device 44 include a loudspeaker and a buzzer.

The boom fall amount detector 50 (an example of a detector) outputs detection information regarding the amount of movement of the boom 4 in a lowering direction (hereinafter "fall amount"). In this case, the fall amount of the boom 4 is the amount of downward movement at a predetermined position in the boom 4 with the shovel 100 being in a predetermined reference state (for example, the state of being positioned in a horizontal plane). The fall amount of the boom 4 may be, for example, the fall amount of the distal end of the boom 4 or the fall amount of the center of the boom 4. The detection information of the boom fall amount detector 50 is fed into the controller 30. Accordingly, the controller 30 can obtain the fall amount of the boom 4 based on the detection information of the boom fall amount detector 50.

The boom fall amount detector 50 may, for example, output detection information regarding the operating state of the boom 4. Accordingly, the controller can directly obtain (calculate) the fall amount of the boom 4 from the operating state of the boom 4. In this case, the boom fall amount detector 50 may include, for example, the above-described boom pose sensor S1, specifically, a rotary potentiometer, a rotary encoder, an acceleration sensor, an angular acceleration sensor, a six-axis sensor, an IMU, or the like. Furthermore, the boom fall amount detector 50 may also output detection information regarding the operating state of the boom cylinder 7. Accordingly, the controller 30 can indirectly obtain (calculate) the fall amount of the boom 4 from the operating state of the boom cylinder 7. In this case, the boom fall amount detector 50 may include, for example, a cylinder sensor that detects the movement position, movement speed, etc., of the boom cylinder 7. Furthermore, the boom fall amount detector 50 may output, for example, detection information regarding the amount of hydraulic oil discharged outside from the bottom-side oil chamber of the boom cylinder 7. Accordingly, the controller 30 can obtain the cumulative amount of hydraulic oil discharged outside from the bottom-side oil chamber of the boom cylinder 7 and also obtain the cumulative amount of hydraulic oil discharged outside from the bottom-side oil chamber of the boom cylinder 7 converted to the fall amount of the boom 4 via the amount of movement of the boom cylinder 7. In this case, the boom fall amount detector 50 may include, for example, the boom bottom pressure sensor S7B that detects the boom bottom pressure, a flow sensor that detects the flow rate of hydraulic oil discharged outside from the bottom-side oil chamber of the boom cylinder 7, etc.

The boom pose sensor S1 is attached to the boom 4 to detect the pose angle, specifically, the elevation angle, of the boom 4 relative to the upper swing structure 3 (hereinafter "boom angle"). The boom pose sensor S1, for example, detects the angle of a straight line connecting the pivot points of the boom 4 at its both ends to the swing plane of the upper swing structure 3 in a side view. Examples of the boom pose sensor S1 may include a rotary potentiometer, a rotary encoder, an acceleration sensor, an angular acceleration sensor, a six-axis sensor, and an IMU (Inertial Measurement Unit), which is hereinafter also the case with the arm pose sensor S2, the bucket pose sensor S3, and the machine body tilt sensor S4. A detection signal corresponding to an boom angle θ1 detected by the boom pose sensor S1 is fed into the controller 30.

The arm pose sensor S2 is attached to the arm 5 to detect the pose angle, specifically, the pivot angle, of the arm 5 relative to the boom 4 (hereinafter "arm angle"), for example, the angle of a straight line connecting the pivot points of the arm 5 at its both ends to the straight line connecting the pivot points of the boom 4 at its both ends in a side view. A detection signal corresponding to an arm angle θ2 detected by the am pose sensor S2 is fed into the controller 30.

The bucket pose sensor S3 is attached to the bucket 6 to detect the pose angle, specifically the pivot angle, of the bucket 6 relative to the arm 5 (hereinafter "bucket angle"), for example, the angle of a straight line connecting the pivot point and the blade edge of the bucket 6 to the straight line connecting the pivot points of the arm 5 at its both ends in a side view. A detection signal corresponding to a bucket angle θ3 detected by the bucket pose sensor S3 is fed into the controller 30.

The machine body tilt sensor S4 detects the tilt state of the machine body (for example, the upper swing structure 3) relative to a predetermined reference plane (for example, a horizontal plane). The machine body tilt sensor S4 is, for example, attached to the upper swing structure 3 to detect the tilt angles of the shovel 100 (namely, the upper swing structure 3) about two axes in its longitudinal direction and lateral direction (hereinafter "longitudinal tilt angle" and "lateral tilt angle"). Detection signals corresponding to the tilt angles (longitudinal tilt angle and lateral tilt angle) detected by the machine body tilt sensor S4 are fed into the controller 30.

A swing state sensor S5 is attached to the upper swing structure 3 to output detection information regarding the swing state of the upper swing structure 3. The swing state sensor S5 detects, for example, the swing angular velocity and the swing angle of the upper swing structure 3. Examples of the swing state sensor S5 include a gyroscope, a resolver, and a rotary encoder. The detection information regarding the swing state detected by the swing state sensor S5 is fed into the controller 30.

When the machine body tilt sensor S4 includes a gyroscope, a six-axis sensor, an IMU or the like that can detect angular velocities about three axes, the swing state (for example, the swing angular velocity) of the upper swing structure 3 may be detected based on a detection signal of the machine body tilt sensor S4. In this case, the swing state sensor S5 may be omitted.

An image capturing device S6 captures an image of an area surrounding the shovel 100. The image capturing device S6 includes a camera S6F that captures an image of an area in front of the shovel 100, a camera S6L that captures an image of an area to the left of the shovel 100, a camera S6R that captures an image of an area to the right of the shovel 100, and a camera S6B that captures an image of an area behind the shovel 100.

The camera S6F is attached to, for example, the ceiling of the cabin 10, that is, inside the cabin 10. The camera S6F, however, may alternatively be attached to the outside the cabin 10, such as the roof of the cabin 10 or the side of the boom 4. The camera S6L is attached to the left end of the upper surface of the upper swing structure 3. The camera S6R is attached to the right end of the upper surface of the upper swing structure 3. The camera S6B is attached to the back end of the upper surface of the upper swing structure 3.

Each image capturing device S6 (the cameras S6F, S6B, S6L and S6R) is, for example, a monocular wide-angle camera having a very wide angle of view. The image capturing device S6 may also be a stereo camera, a distance image camera, or the like. An image captured by the image capturing device S6 is fed into the controller 30.

The boom rod pressure sensor S7R and the boom bottom pressure sensor S7B are attached to the boom cylinder 7 to detect the pressure of the rod-side oil chamber (hereinafter "boom rod pressure") and the pressure of the bottom-side oil chamber (hereinafter "boom bottom pressure), respectively, of the boom cylinder 7. Detection signals corresponding to the boom rod pressure and the boom bottom pressure detected by the boom rod pressure sensor S7R and the boom bottom pressure sensor S7B, respectively, are fed into the controller 30.

The arm rod pressure sensor S8R and the arm bottom pressure sensor S8B are attached to the arm cylinder 8 to detect the pressure of the rod-side oil chamber (hereinafter "arm rod pressure") and the pressure of the bottom-side oil chamber (hereinafter "arm bottom pressure), respectively, of the arm cylinder 8. Detection signals corresponding to the arm rod pressure and the arm bottom pressure detected by the arm rod pressure sensor S8R and the arm bottom pressure sensor S8B, respectively, are fed into the controller 30.

The bucket rod pressure sensor S9R and the bucket bottom pressure sensor S9B are attached to the bucket cylinder 9 to detect the pressure of the rod-side oil chamber (hereinafter "bucket rod pressure") and the pressure of the bottom-side oil chamber (hereinafter "bucket bottom pressure), respectively, of the bucket cylinder 9. Detection signals corresponding to the bucket rod pressure and the bucket bottom pressure detected by the bucket rod pressure sensor S9R and the bucket bottom pressure sensor S9B, respectively, are fed into the controller 30.

The relief valve V7B (an example of a controlling valve) discharges hydraulic oil in the bottom-side oil chamber of the boom cylinder 7 to the outside (a hydraulic oil tank T) to relieve the pressure of hydraulic oil in the bottom-side oil chamber of the boom cylinder 7 in response to a control command from the controller 30. Specifically, the relief valve V7B discharges hydraulic oil in the bottom-side oil chamber of the boom cylinder 7 to the hydraulic oil tank T when the boom bottom pressure exceeds a set pressure determined by a control command from the controller 30. This causes the boom cylinder 7 to move to the bottom side, namely, the retraction side, because of the self-weight of the boom 4 connected to the boom cylinder 7 at the end of its rod, so that the boom 4 moves (pivots) in a lowering direction.

For example, as illustrated in FIG. 2, the relief valve V7B may be provided in a high-pressure hydraulic line between the bottom-side oil chamber of the boom cylinder 7 and the control valve 17. Furthermore, as illustrated in FIG. 3, the relief valve V7B may be provided in a portion built into the control valve 17 of a high-pressure hydraulic line between the bottom-side oil chamber of the boom cylinder 7 and the control valve 17A corresponding to the boom cylinder 7 in the control valve 17. That is, the relief valve V7B may be provided in the high-pressure hydraulic line between the control valve 17A corresponding to the boom cylinder 7 and the bottom-side oil chamber of the boom cylinder 7, irrespective of whether the relief valve V7B is inside or outside the control valve 17.

The relief valve V7B may be contained in the control valve 17A. In this case, the relief valve V7B may be configured to discharge hydraulic oil from an oil passage communicating with a port connected to the bottom-side oil chamber of the boom cylinder 7 in the control valve 17A to a center bypass oil passage in the control valve 17 (an oil passage circulating the hydraulic oil of the main pump 14 to the hydraulic oil tank T).

Furthermore, as illustrated in FIG. 4, the hydraulic oil retainer circuit 90 may be provided in the high-pressure hydraulic line between the bottom-side oil chamber of the boom cylinder 7 and the control valve 17. The hydraulic oil retainer circuit 90 retains (the hydraulic pressure of) hydraulic oil in the bottom-side oil chamber of the boom cylinder 7 when an operation in a direction to lower the boom 4 (hereinafter "boom lowering operation") is not performed through the operating device 26. This, for example, enables the hydraulic oil retainer circuit 90 to prevent the boom 4 from falling in a lowering direction even when the leakage of hydraulic oil or the like occurs on the downstream side with the boom cylinder 7 side being the upstream side.

In this case, the relief valve V7B may be provided on the control valve 17A side (the downstream side with the boom cylinder 7 side being the upstream side) of the hydraulic oil retainer circuit 90 in the high-pressure hydraulic line between the bottom-side oil chamber of the boom cylinder 7 and the control valve 17A in the control valve 17. Specifically, as illustrated in FIG. 4, the relief valve V7B may be provided outside the control valve 17, namely, in a high-pressure hydraulic line between the hydraulic oil retainer circuit 90 and the control valve 17. Furthermore, the same as in the case of FIG. 3, the relief valve V7B may be provided in a portion built into the control valve 17 of the high-pressure hydraulic line between the bottom-side oil chamber of the boom cylinder 7 and the control valve 17A corresponding to the boom cylinder 7 in the control valve 17. Furthermore, the relief valve V7B may be contained in the control valve 17A as described above.

As illustrated in FIG. 5, the hydraulic oil retainer circuit 90 is provided in the high-pressure hydraulic line connecting the control valve 17 and the bottom-side oil chamber of the boom cylinder 7. The hydraulic oil retainer circuit 90 mainly includes a holding valve 90a and a spool valve 90b. According to this example, while two boom cylinders 7 are illustrated in FIG. 5, the boom cylinders 7 are equal in that the control valve 17 and the hydraulic oil retainer circuit 90 are inserted between the main pump 14 and the boom cylinder 7. Therefore, a description focuses on a hydraulic circuit for one of the boom cylinders 7 (the boom cylinder 7 on the right side in the drawing).

The holding valve 90a allows hydraulic oil to flow from the control valve 17 into the bottom-side oil chamber of the boom cylinder 7. Specifically, the holding valve 90a supplies hydraulic oil supplied from the control valve 17 through an oil passage 901 to the bottom-side oil chamber of the boom cylinder 7 through an oil passage 903 in response to an operation in a direction to raise the boom 4 (hereinafter "boom raising operation") on the operating device 26. The holding valve 90*a* blocks hydraulic oil from flowing out from the bottom-side oil chamber of the boom cylinder 7 (the oil passage 903) to the oil passage 901 connected to the control valve 17. The holding valve 90*a* is, for example, a poppet valve.

Furthermore, the holding valve 90*a* is connected to one end of an oil passage 902 branching from the oil passage 901 and can discharge hydraulic oil in the bottom-side oil chamber of the boom cylinder 7 to the downstream oil passage 901 (the control valve 17) through the spool valve 90*b* placed in the oil passage 902. Specifically, when the spool valve 90*b* provided in the oil passage 902 is closed (at the left end spool position in the drawing), the holding valve 90*a* retains hydraulic oil in the bottom-side oil chamber of the boom cylinder 7 to prevent the hydraulic oil from being discharged to the downstream side of the hydraulic oil retainer circuit 90 (the oil passage 901). When the spool valve 90*b* is open (at the center or right end spool position in the drawing), the holding valve 90*a* can discharge hydraulic oil in the bottom-side oil chamber of the boom cylinder 7 to the downstream side of the hydraulic oil retainer circuit 90 via the oil passage 902.

The spool valve 90*b* is provided in the oil passage 902 and allows hydraulic oil in the bottom-side oil chamber of the boom cylinder 7 blocked by the holding valve 90*a* to be diverted and discharged downstream of the hydraulic oil retainer circuit 90 (to the oil passage 901). The spool valve 90*b* has a first spool position that closes the oil passage 902 (the left end spool position in the drawing), a second spool position that partially opens the oil passage 902 (the center spool position in the drawing), and a third spool position that fully opens the oil passage 902 (the right end spool position in the drawing). At the second spool position, the spool valve 90*b* varies the degree of opening according to the magnitude of a pilot pressure input to the pilot port.

When no pilot pressure is input to the pilot port, the spool valve 90*b* has a spool at the first spool position to prevent hydraulic oil in the bottom-side oil chamber of the boom cylinder 7 from being discharged downstream of the hydraulic oil retainer circuit 90 (to the oil passage 901) via the oil passage 902. When a pilot pressure is input to the pilot port, the spool valve 90*b* has the spool at the second position or the third position according to the magnitude of the pilot pressure. Specifically, as the pilot pressure acting on the pilot port increases, the spool valve 90*b* increases the degree of opening at the second position and the spool moves closer to the third spool position from the second spool position. When the pilot pressure acting on the pilot port increases to some extent, the spool valve 90*b* has the spool at the third spool position.

Furthermore, according to this example, a pilot circuit to input a pilot pressure to the spool valve 90*b* is provided. The pilot circuit includes the pilot pump 15, a boom lowering remote control valve 26Aa, a solenoid proportional valve 92, and a shuttle valve 94.

The boom lowering remote control valve 26Aa is connected to the pilot pump 15 through a pilot line 25A. The boom lowering remote control valve 26Aa is included in a lever device with which to operate the boom cylinder 7 in the operating device 26, and outputs a pilot pressure corresponding to a boom lowering operation to a pilot line 27A, using hydraulic oil supplied from the pilot pump 15.

The solenoid proportional valve 92 is provided in a pilot line 25B that branches from the pilot line 25A between the pilot pump 15 and the boom lowering remote control valve 26Aa and bypasses the boom lowering remote control valve 26Aa to be connected to one input port of the shuttle valve 94. The solenoid proportional valve 92 can switch the open and the closed state of the pilot line 25B and proportionally change the flow area, namely, the flow rate, of the pilot line 25B in its open state in response to a control command from the controller 30.

Figure 10:
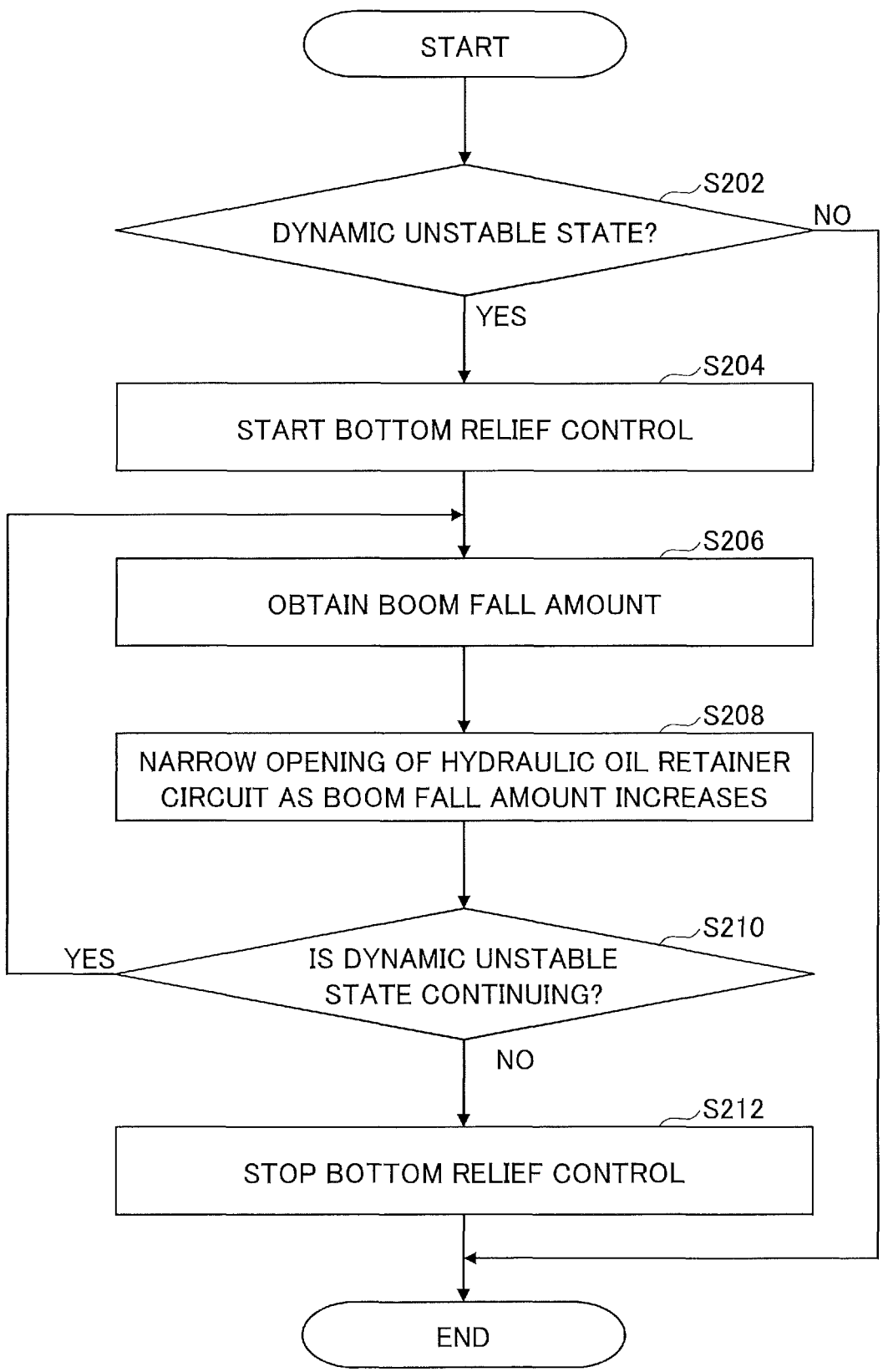
FIG. 10 is a flowchart schematically illustrating another example of the stabilization control process executed by the controller.

When the below-described stabilization control process of FIG. 10 is not adopted, a solenoid selector valve that can only switch the open state and the closed state of the pilot line 25B may be employed in place of the solenoid proportional valve 92.

One end of the pilot line 25B is connected to the one input port of the shuttle valve 94, and one end of the pilot line 27A on the secondary side of the boom lowering remote control valve 26Aa is connected to the other port of the shuttle valve 94. The shuttle valve 94 outputs the higher one of the pilot pressures of the two input ports to the pilot port of the spool valve 90*b*. This causes a pilot pressure to act on the pilot port of the spool valve 90*b* from the shuttle valve 94 to open the spool valve 90*b* during a boom lowering operation. Therefore, the spool valve 90*b* can discharge hydraulic oil in the bottom-side oil chamber of the boom cylinder 7 downstream of the hydraulic oil retainer circuit 90 (to the oil passage 901) via the oil passage 902, in response to a boom lowering operation on the operating device 26. That is, the spool valve 90*b* operates in conjunction with a boom lowering operation on the operating device 26, and when a boom lowering operation is performed through the operating device 26, discharges hydraulic oil blocked by the holding valve 90*a* from the bottom-side oil chamber of the boom cylinder 7. Furthermore, even when no boom lowering operation is performed through the operating device 26, the shuttle valve 94 can cause a pilot pressure to act on the pilot port of the spool valve 90*b* from the solenoid proportional valve 92 via the shuttle valve 94 under the control of the controller 30. Therefore, the controller 30 can disable the hydraulic oil retaining function of the hydraulic oil retainer circuit 90 (the spool valve 90*b*) via the solenoid proportional valve 92 and open the oil passage 902 to discharge hydraulic oil in the bottom-side oil chamber of the boom cylinder 7 downstream of the hydraulic oil retainer circuit 90 (to the oil passage 901), regardless of the presence or absence of a boom lowering operation on the operating device 26 (lever device). Accordingly, the controller 30 can enable the function of relieving the pressure of the bottom-side oil chamber of the boom cylinder 7 with the relief valve V7B placed on the downstream side, namely, the control valve 17 side, of the hydraulic oil retainer circuit 90 by disabling the hydraulic oil retaining function of the hydraulic oil retainer circuit 90 via the solenoid proportional valve 92. The controller 30 can cause the relief valve V7B to relieve the pressure of the bottom-side oil chamber of the boom cylinder 7 by outputting a control command to the relief valve V7B with the function of relieving the pressure of the bottom-side oil chamber of the boom cylinder 7 with the relief valve V7B being enabled.

The relief valve V7B may be provided in a high-pressure hydraulic line on the boom cylinder 7 side of the holding valve 90*a* of the hydraulic oil retainer circuit 90. In this case, the relief valve V7B can discharge hydraulic oil in the bottom-side oil chamber of the boom cylinder 7 to the hydraulic oil tank T, independent of whether the hydraulic oil retaining function of the hydraulic oil retainer circuit 90 is disabled or not. That is, the controller 30 can cause the relief valve V7B to relieve the pressure of the bottom-side oil chamber of the boom cylinder 7 by outputting a control command to the relief valve V7B without disabling the hydraulic oil retaining function of the hydraulic oil retainer circuit 90. Furthermore, in place of the relief valve V7B, a recycle valve (an example of a controlling valve) that discharges (supplies) hydraulic oil in the bottom-side oil chamber of the boom cylinder 7 to the rod-side oil chamber of the boom cylinder 7 may be employed. In this case, in response to a control command from the controller 30, the recycle valve is opened from a fully closed state at a degree of opening corresponding to the contents of the control command. As a result, with the self-weight of the boom 4, the hydraulic oil in the bottom-side oil chamber of the boom cylinder 7 is recycled to the rod-side oil chamber of the boom cylinder 7 through the recycle valve to move the boom 4 in a lowering direction.

The dynamic unstable state determining part 301 determines whether the machine body of the shovel 100 including the lower traveling structure 1 and the upper swing structure 3 is in a state of dynamic instability (hereinafter "dynamic unstable state"). The dynamic unstable state of the machine body represents a state where a predetermined instability phenomenon is likely to occur because of a dynamic disturbance that acts on the machine body according to the movement of the shovel 100 (for example, the reaction moment of a movement of the attachment, a moment that acts during the travel of the lower traveling structure 1, or the like) when the end of the attachment (the bucket 6) is out of contact with the ground and is in the air (hereinafter "during the aerial movement of the attachment"). Furthermore, the dynamic unstable state of the machine body may include a state where a predetermined instability phenomenon is likely to occur because of a dynamic disturbance that acts on the machine body according to the movement of the shovel 100 other than during the aerial movement of the attachment (for example, during the excavating motion of the attachment).

Figure 6A:
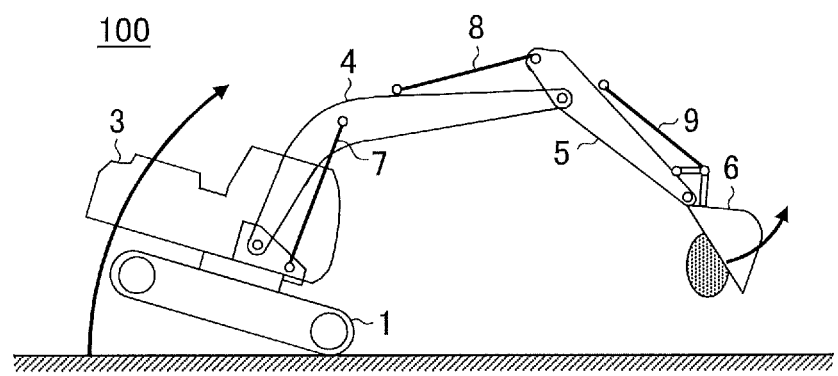
FIG. 6A is a diagram illustrating a specific example of a back lift phenomenon of the shovel.
Figure 6B:
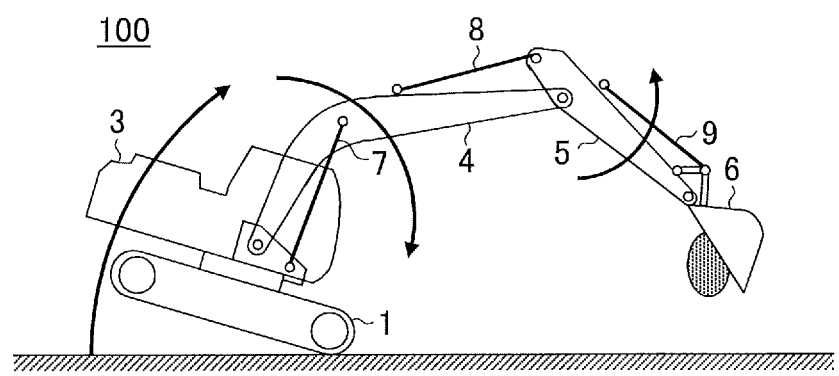
FIG. 6B is a diagram illustrating a specific example of the back lift phenomenon of the shovel.
Figure 6C:
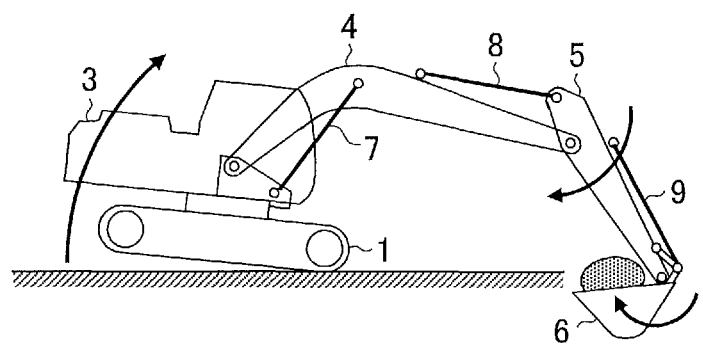
FIG. 6C is a diagram illustrating a specific example of the back lift phenomenon of the shovel.
Figure 6D:
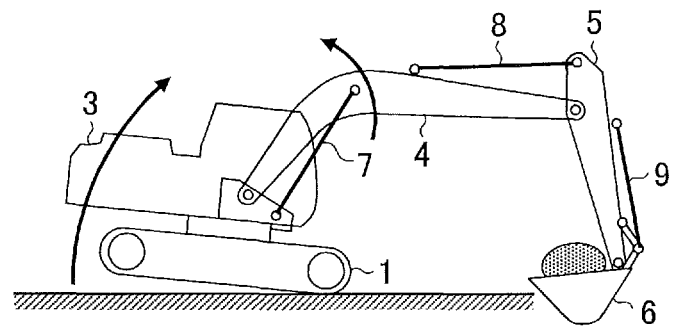
FIG. 6D is a diagram illustrating a specific example of the back lift phenomenon of the shovel.
Figure 6E:
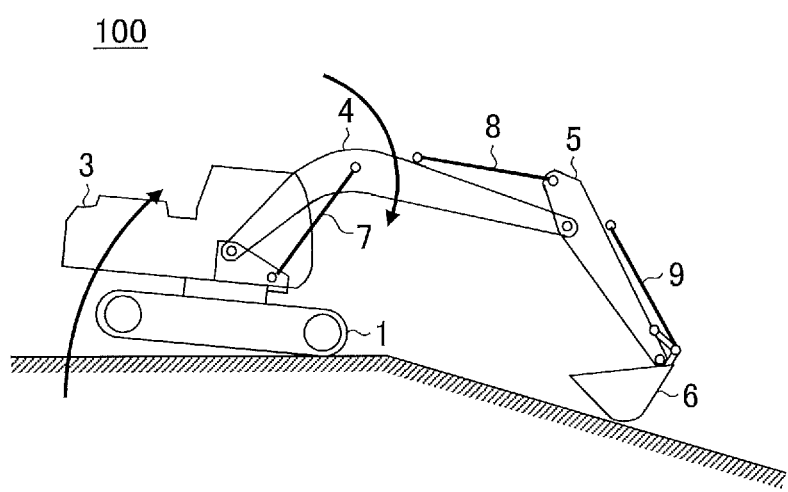
FIG. 6E is a diagram illustrating a specific example of the back lift phenomenon of the shovel.

For example, FIGS. 6A through 6E are diagrams illustrating specific examples of the phenomenon that the back of the machine body (the lower traveling structure 1) of the shovel 100 lifts up (hereinafter "back lift phenomenon") as examples of the predetermined instability phenomenon. Specifically, FIG. 6A is a diagram schematically illustrating a situation where the shovel 100 performs the work of dumping an object (for example, earth or the like) loaded in the bucket 6 (hereinafter, "dumping work" for convenience) by opening the bucket 6. FIG. 6B is a diagram schematically illustrating a situation where the shovel 100 performs the dumping work by lowering the boom 4 and opening the arm 5. FIG. 6C is a diagram schematically illustrating a situation where the shovel 100 performs the work of scooping earth or the like into the bucket 6 (namely, the latter half process of excavation work) by closing the arm 5 and the bucket 6. FIG. 6D is a diagram schematically illustrating a situation where the shovel 100 performs the work of lifting the earth or the like scooped into the bucket 6 by raising the boom 4. FIG. 6E is a diagram schematically illustrating a situation where the shovel 100 rapidly lowers the boom 4 and thereafter suddenly stops the movement immediately above the ground at the start of excavation work.

As illustrated in FIGS. 6A and 6B, when the bucket 6 is opened or when the boom 4 is lowered and the arm 5 is opened with the attachment having earth or the like scooped into the bucket 6 in the air, a reaction moment as the dynamic disturbance acts on the machine body (the upper swing structure 3). Specifically, the reaction moment acts on the vehicle body as such a moment in a pitching direction as to tip the vehicle body forward (hereinafter "dynamic tipping moment").

Furthermore, as illustrated in FIG. 6C, when the shovel 100 attempts to scoop earth or the like into the bucket 6 with an arm closing motion and a bucket closing motion, a reaction force from the ground or earth acts on the bucket 6. As a result, the reaction force causes such a dynamic tipping moment in a pitching direction as to tip the vehicle body of the shovel 100 forward to act on the vehicle body through the attachment.

Furthermore, as illustrated in FIG. 6D, when the shovel 100 raises the boom 4 from the state where the bucket 6 is grounded, such a dynamic tipping moment in a pitching direction as to tip the vehicle body forward is caused to act on the vehicle body by a load such as earth or the like loaded into the bucket 6.

Furthermore, as illustrated in FIG. 6E, when the shovel 100 rapidly lowers the boom 4 and thereafter suddenly stops the movement, a dynamic tipping moment acts on the vehicle body from the attachment as a dynamic disturbance caused by the sudden stop of the attachment.

Furthermore, the back lift phenomenon of the shovel 100 may occur in a situation other than those illustrated in FIGS. 6A through 6E.

For example, when the arm 5 and the bucket 6 is connected by quick coupling, there may be a phase difference between the movements of the boom 4 and the arm and the movement of the bucket 6. In this case, depending on the form of a phase lag, a reaction moment due to the movement of the bucket 6 may act on the machine body as a dynamic tipping moment in an amplified manner through the attachment.

Furthermore, for example, during the travel of the shovel 100 (the lower traveling structure 1) with the attachment facing in a travel direction, the travel of the shovel 100 may be hindered by the operator's operation or because of irregularities of the ground to rapidly decelerate the lower traveling structure 1. In this case, a dynamic tipping moment about a tipping fulcrum based on an inertial force caused to act on the machine body and the attachment by the rapid deceleration of the shovel 100 may act on the machine body to cause the back lift phenomenon of the shovel 100.

The state where "the attachment faces in a travel direction" includes not only a state where the travel direction of the lower traveling structure 1 and the orientation of the attachment completely coincide with each other but also a state where the difference between the travel direction of the lower traveling structure 1 and the orientation of the attachment is relatively small. The same applies to the following examples.

Furthermore, for example, when the shovel 100 enters a downslope having a relatively large slope angle or when the front of the lower traveling structure 1 falls in a relatively large hole during the travel of the shovel 100 (the lower traveling structure 1) with the attachment facing in a travel direction, the forward tilt of the machine body may suddenly increase. In this case, the sudden increase of the forward tilt of the machine body causes a downward acceleration (acceleration of gravity) in the machine body, and the front of the lower traveling structure 1 touches the ground immediately thereafter to suddenly decelerate the machine body (the lower traveling structure 1). In response to this sudden deceleration, a dynamic tipping moment about a tipping fulcrum based on an inertial force acting on the attachment may act to cause the back lift phenomenon of the shovel 100.

Hereinafter, a situation where the back lift phenomenon occurs according to the movement of the shovel 100 as described above is referred to as "dynamic unstable situation".

A tipping moment to cause forward tipping (namely, to lift the back) with the ground contact point of the front end portion of the lower traveling structure 1 serving as a fulcrum (hereinafter "tipping fulcrum") and a restraining moment to restrain forward tipping (namely, a back lift) act on the machine body of the shovel 100. The tipping moment includes a static tipping moment due to the self-weight of the attachment (hereinafter "static tipping moment") and the above-describe dynamic tipping moment caused by the movement of the shovel 100. The restraining moment is caused to act by the self-weight of the machine body (the lower traveling structure 1 and the upper swing structure 3). Therefore, as the position of the bucket 6 moves away from the tipping fulcrum, that is, the position of the bucket 6 moves away from the machine body (the lower traveling structure 1 and the upper swing structure 3), the tipping moment increases. Furthermore, as the weight of the bucket 6 including a loaded object increases, the tipping moment increases. Furthermore, the degree of change of the movement of the shovel 100 (for example, the angular acceleration of the opening motion of the bucket 6 during the dumping work of the shovel 100) increases, the tipping moment (dynamic tipping moment) increases. Furthermore, when the orientation of the upper swing structure 3 relative to the lower traveling structure 1, namely, the orientation of the attachment, does not coincide with the travel direction of the lower traveling structure 1, the front end of the ground contact surface of the lower traveling structure 1 moves closer to the machine body. Therefore, the position of the bucket 6 relatively moves away from the tipping fulcrum and the position of the center of gravity of the machine body moves toward the tipping fulcrum. Thus, the tipping moment increases and the restraining moment decreases.

Accordingly, depending on conditions such as the positional relationship of the bucket 6 with the machine body, the weight of the bucket 6 including a loaded object, the degree of change of the movement of the shovel 100, and the orientation of the upper swing structure 3 relative to the lower traveling structure 1, the tipping moment is larger than the restraining moment, so that the back lift phenomenon of the shovel 100 may occur.

Figure 7A:
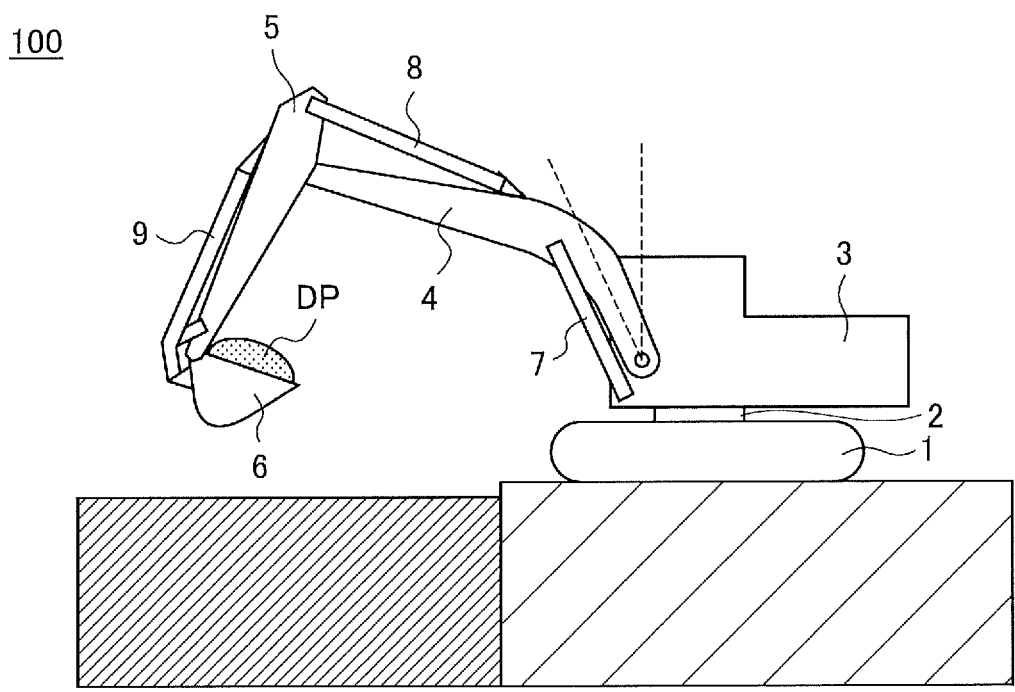
FIG. 7A is a diagram illustrating a specific example of an oscillatory phenomenon of the shovel.
Figure 7B:
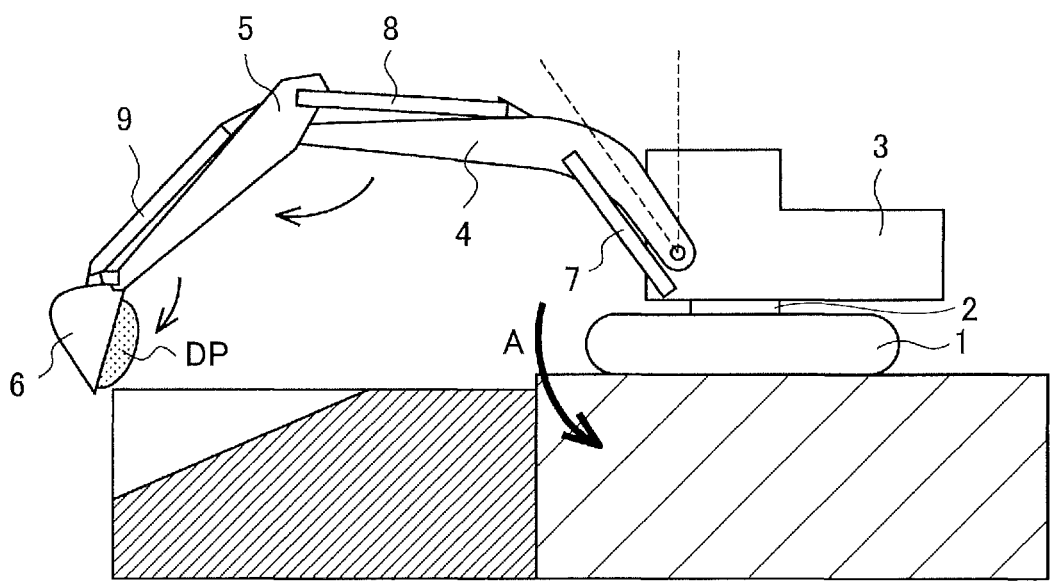
FIG. 7B is a diagram illustrating the specific example of the oscillatory phenomenon of the shovel.
Figure 8A:
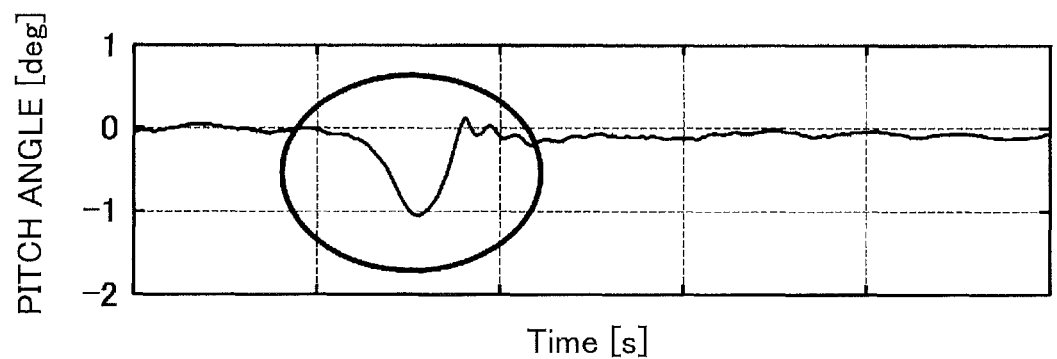
FIG. 8A is a diagram illustrating the specific example of the oscillatory phenomenon of the shovel.
Figure 8B:
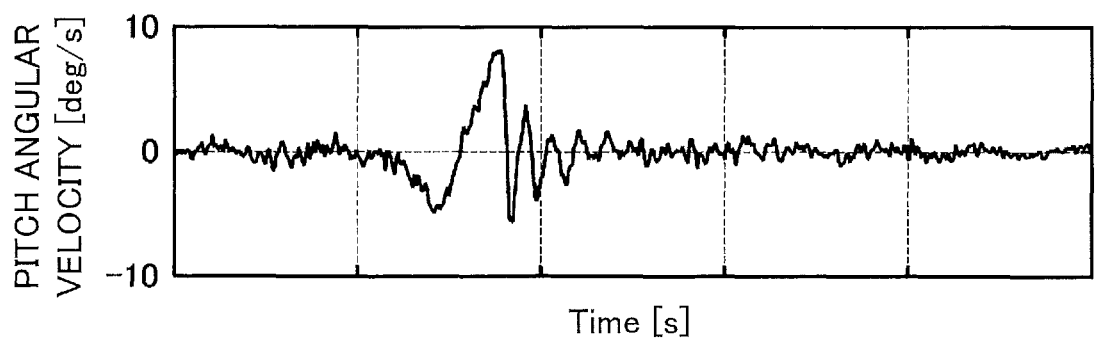
FIG. 8B is a diagram illustrating the specific example of the oscillatory phenomenon of the shovel.

Furthermore, FIG. 7 (FIGS. 7A and 7B) and FIG. 8 (FIGS. 8A and 8B) are diagrams illustrating a specific example of the oscillatory phenomenon of the shovel 100 as an example of the predetermined instability phenomenon. Specifically, FIGS. 7A and 7B are diagrams illustrating a situation where an oscillatory phenomenon occurs in the machine body of the shovel 100 during the aerial movement of the attachment. Furthermore, FIGS. 8A and 8B are charts illustrating time waveforms of an angle and an angular velocity in a pitching direction (hereinafter "pitch angle" and "pitch angular velocity), respectively, associated with the dumping motion of the shovel 100 in FIGS. 7A and 7B. According to this example, the dumping motion in which the shovel 100 dumps a loaded object DP in the bucket 6 is described as an example of the aerial movement.

As illustrated in FIG. 7A, the shovel 100 has the bucket 6 and the arm 5 closed and the boom 4 raised. The bucket 6 is loaded with the loaded object DP such as earth or the like.

As illustrated in FIG. 7B, when the dumping motion of the shovel 100 is performed from the state illustrated in FIG. 7A, the bucket 6 and the arm 5 are opened wide and the boom 4 is lowered to dump the loaded object DP outside the bucket 6. At this point, a change in the moment of inertia of the attachment acts to oscillate the vehicle body of the shovel 100 in the pitching direction indicated by arrow A in the drawing.

Specifically, it is found that as illustrated in FIGS. 8A and 8B, the aerial movement (dumping motion) of the attachment causes a dynamic tipping moment to tip the shovel 100 forward (see a circled portion in FIG. 8A) to cause an oscillatory phenomenon in the pitching direction in the machine body.

Furthermore, an oscillatory phenomenon in the pitching direction may likewise be caused by the above-described dynamic tipping moment that acts in the dynamic unstable situation as well.

For example, the dynamic unstable state determining part 301 may determine whether the machine body of the shovel 100 is in the dynamic unstable state by comparing the tipping moment to tip the machine body of the shovel 100 forward about a tipping fulcrum (the ground contact point of the front end portion of the lower traveling structure 1) and the restraining moment to restrain forward tipping.

As described above, the tipping moment includes the static tipping moment due to the self-weight of the attachment and the above-described dynamic tipping moment associated with the movement of the shovel 100. Of these, the dynamic tipping moment depends on the load state of the attachment, namely, the respective thrusts of the boom cylinder 7, the arm cylinder 8, and the bucket cylinder 9, and the pose state and the operating state of the attachment, namely, the respective pose angles about a pivot point, angular velocities, angular accelerations, etc., of the boom 4, the arm 5, and the bucket 6. The restraining moment depends on the machine body of the shovel 100, namely, the self-weights of the lower traveling structure 1 and the upper swing structure 3, the distances between a tipping fulcrum and their respective centers of gravity, etc.

Accordingly, the dynamic unstable state determining part 301 can calculate the tipping moment based on detection information regarding the load state, pose state, and operating state of the attachment, namely, the detection values of the sensors S1 through S4, S7B, S7R, S8B, S8R, S9B, S9R, etc. Furthermore, the dynamic unstable state determining part 301 can calculate the restraining moment from the self-weights of the lower traveling structure 1 and the upper swing structure 3, the distances between their respective centers of gravity and a tipping fulcrum, etc. The dynamic unstable state determining part 301 may determine whether the calculated values of the tipping moment and the restraining moment satisfy a predetermined conditional expression within the range where the tipping moment does not exceed the restraining moment (hereinafter "dynamic tipping restraining conditional expression"). Accordingly, the dynamic unstable state determining part 301 can determine that the machine body of the shovel 100 is in the dynamic unstable state when the dynamic tipping restraining conditional expression is not satisfied.

Furthermore, for example, the dynamic unstable state determining part 301 may determine whether the machine body of the shovel 100 is in the dynamic unstable state, using the fact that the boom bottom pressure of the boom cylinder 7 or the arm rod pressure of the arm cylinder 8 becomes excessive when the dynamic tipping moment acts. Specifically, the dynamic unstable state determining part 301 may determine that the machine body of the shovel 100 is in the dynamic unstable state when the detected value of the boom bottom pressure of the boom cylinder 7 or the arm rod pressure of the arm cylinder 8 is above a predetermined upper limit value.

Furthermore, for example, the dynamic unstable state determining part 301 may also determine whether the machine body of the shovel 100 is in the dynamic unstable state by identifying a specific situation where an instability phenomenon is likely to dynamically occur in response to the movement of the shovel 100 (dynamic unstable situation).

Specifically, the dynamic unstable state determining part 301 may determine that the machine body of the shovel 100 is in the dynamic unstable state when the attachment makes the motion of dumping a loaded object in the bucket 6 (see, for example, FIGS. 6A, 6B, 7A and 7B). In this case, the controller 30 may determine whether the attachment makes the motion of dumping a loaded object in the bucket 6 based on the current pose state of the attachment determined from the detection values of the boom pose sensor S1, the arm pose sensor S2, and the bucket pose sensor S3 or the immediately preceding operating state of the shovel 100 (for example, whether a turning motion has been made with the pose state of the attachment having the bucket 6 loaded with earth or the like). Furthermore, the controller 30 may determine whether the attachment makes the motion of dumping a loaded object in the bucket 6 based on an image captured by the image capturing device S6.

Furthermore, the dynamic unstable state determining part 301 may determine that the machine body of the shovel 100 is in the dynamic unstable state when the lower traveling structure 1 suddenly decelerates during the travel of the shovel 100 (the lower traveling structure 1) with the attachment facing in a travel direction. In this case, the controller 30 may determine the degree of coincidence of the orientation of the attachment and the travel direction of the lower traveling structure 1 based on the swing angle of the upper swing structure 3 detected by the machine body tilt sensor S4, how the lower traveling structure 1 looks in an image captured by the image capturing device S6, or the like. Furthermore, the controller 30 may determine the state of deceleration of the lower traveling structure 1 based on the detection value of (an acceleration sensor or the like included in) the machine body tilt sensor S4.

Furthermore, the dynamic unstable state determining part 301 may determine that the machine body of the shovel 100 is in the dynamic unstable state when the amount of tilt of the machine body suddenly increases during the travel of the shovel 100 (the lower traveling structure 1) with the attachment facing in a travel direction. In this case, the controller 30 may determine the increasing state of the amount of tilt of the machine body based on the detection information of the machine body tilt sensor S4, an image captured by the image capturing device S6, or the like.

The stabilization control part 302 executes control to control the occurrence of instability phenomena that occur in the machine body of the shovel 100 (for example, the back lift phenomenon and the oscillatory phenomenon) to stabilize the machine body of the shovel 100 (hereinafter "stabilization control").

For example, when the dynamic unstable state determining part 301 determines that the machine body of the shovel 100 is in the dynamic unstable state, the stabilization control part 302 outputs a control command to the relief valve V7B or to the relief valve V7B and the solenoid proportional valve 92 to relieve the pressure of the bottom-side oil chamber of the boom cylinder 7.

Accordingly, in a situation where the dynamic tipping moment may occur as described above, the stabilization control part 302 can relieve the pressure of the bottom-side oil chamber of the boom cylinder 7 to achieve a state where hydraulic oil in the bottom-side oil chamber of the boom cylinder 7 is allowed to flow outside. Therefore, the boom cylinder 7 can be moved in a retracting direction, namely, the lowering direction of the boom 4, by the self-weight of the boom 4. Accordingly, at least part of a dynamic disturbance that causes a dynamic tipping moment to act on the machine body is absorbed by the movement of the boom cylinder 7 in the retracting direction (lowering direction), so that the dynamic disturbance is less likely to be transmitted as a dynamic tipping moment on the machine body to make it possible to control predetermined instability phenomena such as the back lift phenomenon and the oscillatory phenomenon of the shovel 100. The details of the stabilization control executed by the stabilization control part 302 are described below.

Instead of controlling the relief valve V7B, the stabilization control part 302 may control the control valve 17 (specifically, the control valve 17A) to directly (actively) move the boom 4 in the lowering direction.

Furthermore, the stabilization control part 302 limits the fall amount of the boom 4 during the stabilization control. Accordingly, the controller 30 can control the movement of the boom 4 in the lowering direction while controlling instability phenomena that may occur in the machine body of the shovel 100, according to the movement of the shovel 100.

For example, the stabilization control part 302 may limit the movement speed of the boom 4 in the lowering direction during the stabilization control such that the movement speed is relatively low. In this case, the stabilization control part 302 may perform limiting such that the movement speed of the boom 4 in the lowering direction at each point of time is less than or equal to a predetermined upper limit value or may perform limiting such that the fall amount during a predetermined period (namely, the average movement speed) of the boom 4 is less than or equal to a predetermined upper limit value. Accordingly, the stabilization control part 302 can limit the amount of movement of the boom 4 in the lowering direction per unit time such that the amount of movement of the boom 4 in the lowering direction per unit time is relatively low.

Furthermore, for example, the stabilization control part 302 may limit the absolute amount of movement of the boom 4 in the lowering direction during the stabilization control. That is, the stabilization control part 302 may execute the stabilization control so that the movement of the boom 4 in the lowering direction stops within a range where the fall amount of the boom 4 is less than or equal to a predetermined threshold.

The details of the stabilization control centered on the stabilization control part 302 are described below (see FIGS. 9 and 10). [Example of Automatic Attachment Controlling Function]

Next, an example of the function of automatically controlling the attachment (a stabilization control function) executed by the controller 30 (the dynamic unstable state determining part 301 and the stabilization control part 302) is described with reference to FIGS. 9 and 10.

Example of Stabilization Control

Figure 9:
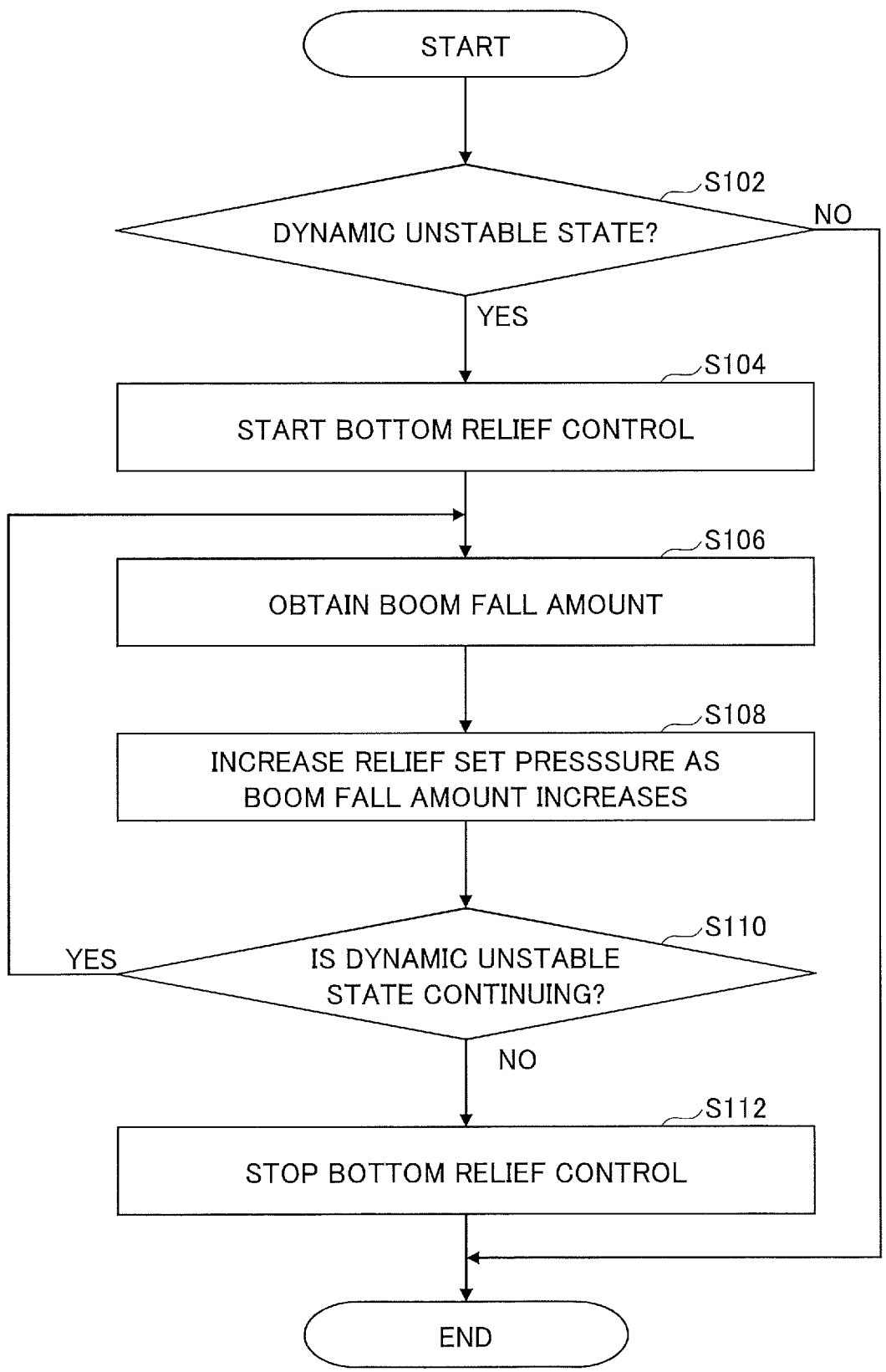
FIG. 9 is a flowchart schematically illustrating an example of a stabilization control process executed by a controller.

FIG. 9 is a flowchart schematically illustrating an example of a process related to the stabilization control by the controller 30 (hereinafter "stabilization control process"). The process according to this flowchart is repeatedly executed at predetermined processing intervals during a period from the start of the shovel 100 to the stop of the shovel 100. The same is the case of the flowchart of FIG. 10.

At step S102, the dynamic unstable state determining part 301 determines whether the machine body of the shovel 100 is in the dynamic unstable state, namely, whether a predetermined instability phenomenon is likely to occur in the machine body of the shovel 100. If the machine body of the shovel 100 is in the dynamic unstable state, that is, a predetermined instability phenomenon is likely to occur in the machine body of the shovel 100, step S104 is entered. Otherwise, the process of this time is ended.

At step S104, the stabilization control part 302 starts control to output a control command to the relief valve V7B or to the solenoid proportional valve 92 and the relief valve V7B to relieve hydraulic oil in the bottom-side oil chamber of the boom cylinder 7 via the relief valve V7B (hereinafter "bottom relief control").

At step S106, the stabilization control part 302 obtains the fall amount of the boom 4 after the start of the bottom relief control based on detection information fed from the boom fall amount detector 50.

At step S108, the stabilization control part 302 increases the set pressure of the relief valve V7B as the obtained fall amount of the boom 4 increases. As a result, as the fall amount of the boom 4 increases, hydraulic oil in the bottom-side oil chamber of the boom cylinder 7 becomes less likely to be discharged outside, specifically, the flow rate of hydraulic oil discharged outside from the bottom-side oil chamber of the boom cylinder 7 decreases. Therefore, the controller 30 can limit the fall amount of the boom 4 after the start of the bottom relief control. In this case, the stabilization control part 302 may determine the set pressure of the relief valve V7B based on, for example, a control map in which the correspondence between the fall amount of the boom 4 and the set pressure of the relief valve V7B is predetermined.

At step S110, the dynamic unstable state determining part 301 determines whether the dynamic unstable state of the machine body of the shovel 100 is continuing, that is, whether the state where a predetermined instability phenomenon is likely to occur in the machine body of the shovel 100 is continuing. If the dynamic unstable state of the machine body of the shovel 100 is continuing, that is, the state where a predetermined instability phenomenon is likely to occur in the machine body of the shovel 100 is continuing, the dynamic unstable state determining part 301 returns to step S106 to repeat the process of steps S106 through S110. If the dynamic unstable state of the machine body of the shovel 100 is terminated, that is, the state where a predetermined instability phenomenon is likely to occur in the machine body of the shovel 100 is terminated, the dynamic unstable state determining part 301 proceeds to step S112.

At step S112, the dynamic unstable state determining part 301 stops the bottom relief control by stopping controlling the relief valve V7B or the solenoid proportional valve 92 and the relief valve V7B to end the process of this time.

Thus, according to this example, the controller moves the boom 4 in the lowering direction in such a manner as to limit the amount of movement of the boom 4 in the lowering direction, according to the movement of the shovel 100. Specifically, according to the movement of the shovel 100, the controller 30 controls the relief valve V7B to discharge hydraulic oil in the bottom-side oil chamber of the boom cylinder 7 to the outside and controls the relief valve V7B to decrease the flow rate of hydraulic oil discharged outside from the bottom-side oil chamber of the boom cylinder 7 as the fall amount of the boom 4 increases. Through this, the controller 30 can control the movement of the boom 4 in the lowering direction while controlling instability phenomena that may occur in the machine body of the shovel 100, according to the movement of the shovel 100 as described above.

Another Example of Stabilization Control

FIG. 10 is a flowchart schematically illustrating another example of the stabilization control process executed by the controller 30. Specifically, FIG. 10 is a flowchart illustrating a stabilization control process that may be adopted by the controller 30 of the shovel 100 in which the hydraulic oil retainer circuit 90 (see FIGS. 4 and 5) is installed.

A description of the process of steps S202 through S206, S210 and S212, which is the same as that of steps S102 through S106, S110 and S112 of FIG. 9, is omitted.

At step S208, the stabilization control part 302 decreases the degree of disabling the hydraulic oil retainer circuit 90, that is, narrows the opening to the downstream side (control valve 17 side) of the hydraulic oil retainer circuit 90, as the obtained fall amount of the boom 4 increases. Specifically, the stabilization control part 302 reduces the degree of opening of the spool valve 90*b* by changing a control command to the solenoid proportional valve 92 as the obtained fall amount of the boom 4 increases. Accordingly, as the fall amount of the boom 4 increases, hydraulic oil in the bottom-side oil chamber of the boom cylinder 7 becomes less likely to flow to the downstream side of the hydraulic oil retainer circuit 90. Therefore, as a result, the controller 30 can decrease the flow rate of hydraulic oil discharged outside from the bottom-side oil chamber of the boom cylinder 7 to limit the fall amount of the boom 4 after the start of the bottom relief control through the relief valve V7B positioned downstream of the hydraulic oil retainer circuit 90 (the spool valve 90*b*). In this case, the stabilization control part 302 may determine the details of the control command to the solenoid proportional valve 92 based on, for example, a control map in which the correspondence between the fall amount of the boom 4 and a control command (for example, a control current value) to the solenoid proportional valve 92 corresponding to the degree of opening of the spool valve 90*b* is predetermined.

Thus, according to this example, the controller controls the hydraulic oil retainer circuit 90 to disable the function of blocking the outflow of hydraulic oil from the bottom-side oil chamber of the boom cylinder 7 (hereinafter "blocking function") and controls the relief valve V7B to discharge hydraulic oil in the bottom-side oil chamber of the boom cylinder 7 to the outside, and controls the hydraulic oil retainer circuit 90 to decrease the degree of disabling the blocking function of the hydraulic oil retainer circuit 90, thereby decreasing the flow rate of hydraulic oil discharged outside from the bottom-side oil chamber of the boom cylinder 7, as the fall amount of the boom 4 increases, according to the movement of the shovel 100. Through this, the controller 30 can control the movement of the boom 4 in the lowering direction while controlling instability phenomena that may occur in the machine body of the shovel 100, according to the movement of the shovel 100 as described above.

According to this example, the controller 30 discharges hydraulic oil in the bottom-side oil chamber of the boom cylinder 7 to the outside (moves the boom 4 in the lowering direction) when the machine body of the shovel 100 is in the dynamic unstable state, that is, when a predetermined instability phenomenon is likely to occur in the machine body of the shovel 100. This configuration, however, is non-limiting. For example, the controller 30 may also be configured to discharge hydraulic oil in the bottom-side oil chamber of the boom cylinder 7 to the outside (moves the boom 4 in the lowering direction) when (specifically, immediately after) a predetermined instability phenomenon such as the back lift phenomenon or the oscillatory phenomenon occurs. This makes it possible to control the aggravation of the predetermined instability phenomenon such as the back lift phenomenon or the oscillatory phenomenon of the machine body of the shovel 100 that has already occurred and promptly curb the instability phenomenon. In this case, the controller 30 may detect the occurrence of the back lift phenomenon, the oscillatory phenomenon, or the like of the lower traveling structure 1 based on the detection value of the machine body tilt sensor S4, an image captured by the image capturing device S6, or the like. Furthermore, instead of or in addition to limiting the amount of movement of the boom 4 to a predetermined standard or below it, the controller 30 may limit the movement speed, the movement acceleration, or the like to a predetermined standard or below it.

Another Example of Automatic Control Function of Shovel

Next, another example of the automatic control function of the shovel is described.

For example, unlike in the case of the above-described example, the controller 30 may automatically move the arm 5 instead of or in addition to the boom 4 in the stabilization control function.

Specifically, when a predetermined instability phenomenon is likely to occur or has occurred in the machine body of the shovel 100, the controller 30 may automatically move the arm 5 in a closing direction. For example, the controller 30 may cause the arm 5 to be moved in the closing direction by the self-weight of the arm 5 by discharging hydraulic oil in the rod-side oil chamber of the arm cylinder 8 through a relief valve to relieve the pressure of the hydraulic oil. This brings the position of the center of gravity of the attachment closer to the machine body side to improve the degree of static stability of the shovel 100, so that the back lift phenomenon, etc., of the machine body of the shovel 100 can be controlled. Furthermore, for example, even when the back lift phenomenon is likely to dynamically occur in the machine body of the shovel 100 according to the movement of the shovel 100, the arm cylinder 8 serves as a cushion, so that the back lift phenomenon can be controlled. In this case, the same as in the above-described case of the boom 4, the controller 30 may limit at least one of the amount of movement, movement speed, and movement acceleration of the arm 5 in the closing direction to a predetermined standard or below it. This makes it possible to relatively reduce the movement of the shovel 100 while controlling the occurrence of instability phenomena in the machine body of the shovel 100, thereby reducing anxiety caused to the operator, workers around, etc.

Furthermore, for example, instead of or in addition to the stabilization control function, the controller 30 may automatically move the attachment through the automatic operation function. In this case, the same as in the above-described example, the controller 30 may limit at least one of the amount of movement, movement speed, and movement acceleration of the attachment (at least one of the boom 4, the arm 5, and the bucket 6) to a predetermined standard or below it. This makes it possible to relatively reduce the movement of the shovel 100 while implementing the automatic operation function of the shovel 100, thereby reducing anxiety caused to the operator, workers around, etc.

[Configuration of Shovel Management System]

Next, a configuration of a shovel management system SYS is described with reference to FIG. 11.

Figure 11:
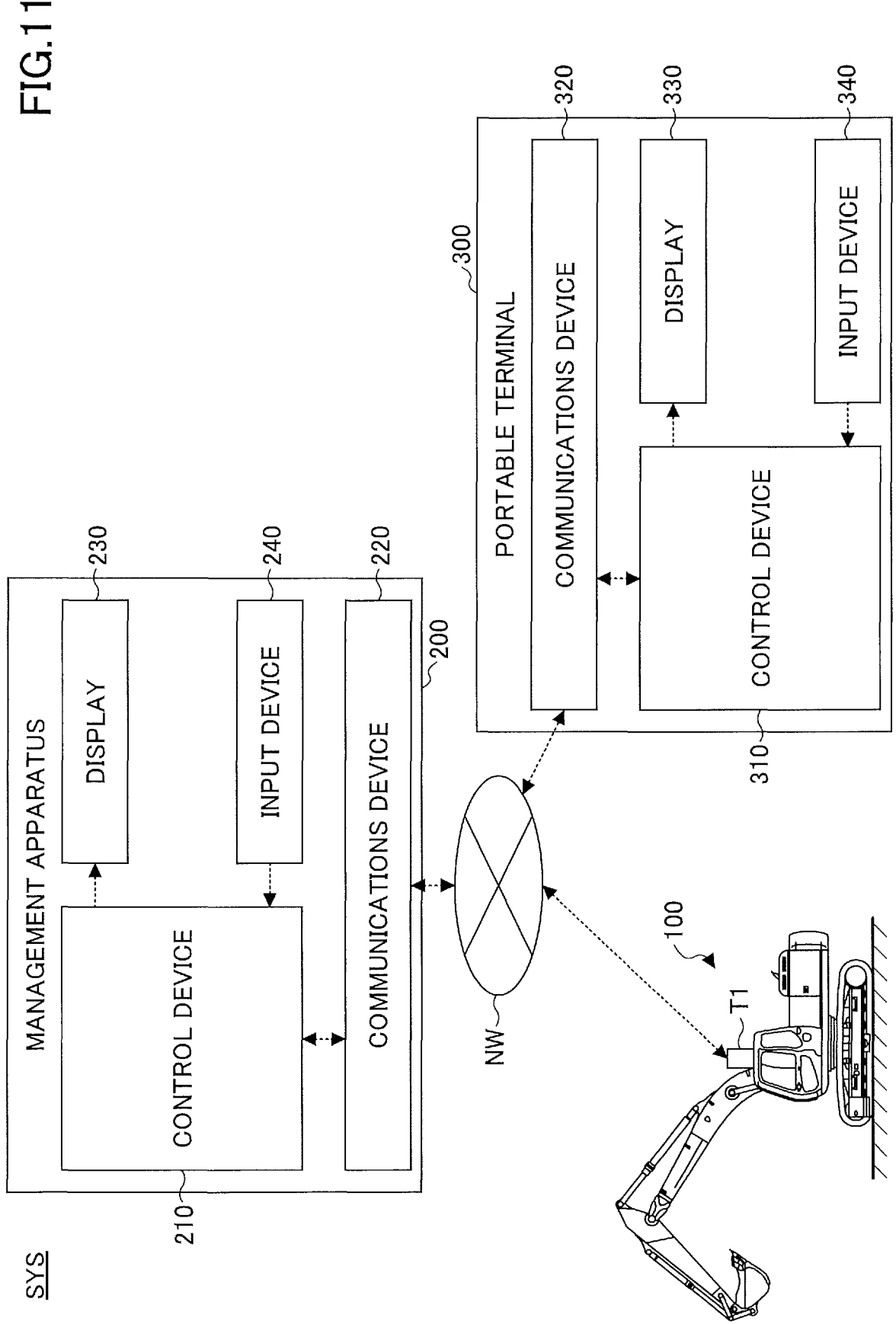
FIG. 11 is a diagram illustrating an example configuration of a shovel management system.

As illustrated in FIG. 11, the shovel 100 may be a constituent element of the shovel management system SYS.

The shovel management system SYS includes the shovel 100, the management apparatus 200, and a portable terminal 300. The number of shovels 100 included in the shovel management system SYS may be one or more. The number of portable terminals 300 included in the shovel management system SYS may be one or more.

According to the shovel management system SYS, for example, the management apparatus 200 collects various kinds of information from the shovel 100 to monitor the operation status or the presence or absence of a failure of the shovel 100. Furthermore, according to the shovel management system SYS, for example, the management apparatus 200 delivers various kinds of information on the shovel 100 to the portable terminal 300 or the management apparatus 200 transmits a control command to the shovel 100.

<Configuration of Shovel>

As illustrated in FIG. 11, the shovel 100 includes a communications device T1 to be able to communicate with the management apparatus 200.

The communications device T1 communicates with an apparatus external to the shovel 100 (for example, the management apparatus 200) through a predetermined communication line NW. The communication line NW may include, for example, a mobile communication network including a base station as a terminal end. Furthermore, the communication line NW may also include, for example, a satellite communication network using a communications satellite. Furthermore, the communication line NW may also include, for example, the Internet. Furthermore, the communication line NW may also be, for example, a short-range communication network based on a standard such as Bluetooth (registered trademark) or Wi-Fi.

The communications device T1, for example, uploads (transmits) various kinds of information obtained at the shovel 100 to the management apparatus 200 under the control of the controller 30. Furthermore, the communications device. T1, for example, receives information transmitted from the management apparatus 200 through the communication line NW. The information received by the communications device T1 is fed into the controller 30.

The configuration of the shovel 100 other than the communications device T1 may be represented by, for example, FIG. 2 through 4. Therefore, a description of other configurations is omitted.

<Configuration of Management Apparatus>

The management apparatus 200 is placed outside the shovel 100. The management apparatus 200 is, for example, a server installed at a location different from a work site where the shovel 100 performs work. The server may be a cloud server or an edge server. Furthermore, the management apparatus 200 may also be a management terminal placed in a management office at a work site where the shovel 100 performs work.

The management apparatus 200 includes a control device 210, a communications device 220, a display 230, and an input device 240.

The control device 210 executes various kinds of control related to the operation of the management apparatus 200. The functions of the control device 210 may be implemented by desired hardware or a combination of desired hardware and software. For example, the control device 210 is constituted mainly of a computer that includes a CPU, a memory unit such as a RAM, a secondary storage such as a ROM, and various input/output interface devices. Hereinafter, the same is true for a control device 310 of the portable terminal 300 described below.

The communications device 220 communicates with predetermined external apparatuses (for example, the shovel 100 and the portable terminal 300) through the communication line NW. The communications device 220, for example, transmits various kinds of information to the shovel 100 and the portable terminal 300 under the control of the control device 210. Furthermore, the communications device 220, for example, receives information transmitted (uploaded) from the shovel 100 and the portable terminal 300. The information received by the communications device 220 is fed into the control device 210.

The display 230 displays various kinds of information images to a manager, a worker, or the like at the management apparatus 200 (hereinafter "manager or the like") under the control of the control device 210. The display 230 is, for example, an organic EL (Electroluminescence) display or a liquid crystal display. Hereinafter, the same applies to a display 330 of the portable terminal 300 described below.

The input device 240 receives an operation input from the manager or the like at the management apparatus 200 and outputs the operation input to the control device 210. Examples of the input device 240 include desired hardware operation input devices such as a button, a toggle, a lever, a joystick, a keyboard, a mouse, and a touchscreen. The input device 240 may also include a virtual operation input part (for example, a button icon) displayed on the display 230 and operable through a hardware operation input device (for example, a touchscreen). The same is true for an input device 340 of the portable terminal 300 described below.

For example, the function of the dynamic unstable state determining part 301 described above may be transferred to the management apparatus 200 (the control device 210). In this case, the control device 210 may, for example, monitor (determine) whether the machine body of the shovel 100 is in the dynamic unstable state in the same manner as described above based on the information uploaded from the shovel 100. The control device 210 may make a notification that the shovel 100 is in the dynamic unstable state through the communications device 220. This allows the shovel 100 (the controller 30) to activate the stabilization control function in response to the notification from the management apparatus 200.

Furthermore, for example, the function of the stabilization control part 302 described above as well may further be transferred to the management apparatus 200 (the control device 210). In this case, in response to determining that the shovel 100 is in the dynamic unstable state or in a static unstable state, the control device 210 may transmit a control command to execute the bottom relief control of the boom cylinder 7 to the shovel 100 through the communications device 220.

Furthermore, the control device 210 may, for example, sequentially transmit information on the results of monitoring (the results of determination) as to whether the machine body of the shovel 100 is in the dynamic unstable state to the portable terminal 300. This enables the manager of the shovel 100, a supervisor at a work site, or the like who carries the portable terminal 300 to know the stability of the shovel 100 from its outside.

<Configuration of Portable Terminal>

The portable terminal 300 is carried by an owner, a manager, a supervisor at a work site, an operator or the like of the shovel 100. Examples of the portable terminal 300 include a cellular phone, a smartphone, a tablet terminal, and a laptop computer terminal.

The portable terminal 300 includes the control device 310, a communications device 320, the display 330, and the input device 340.

The control device 310 executes various kinds of control related to the operation of the portable terminal 300.

The communications device 320 communicates with a predetermined external apparatus (for example, the management apparatus 200) through the communication line NW. The communications device 320, for example, transmits various kinds of information to the management apparatus 200 under the control of the control device 310. Furthermore, the communications device 320, for example, receives information transmitted (downloaded) from the management apparatus 200. The information received by the communications device 320 is fed into the control device 310.

The display 330 displays various kinds of information images to a user of the portable terminal 300 under the control of the control device 310.

The input device 340 receives an operation input from a user of the portable terminal 300 and outputs the operation input to the control device 310.

A user of the portable terminal 300 performs a predetermined operation on the input device 340 to start a predetermined application program (hereinafter "shovel stability viewer app") installed in the control device 310. The user of the portable terminal 300 performs, through the input device 340, an operation for causing a request signal requesting to view the results of monitoring as to the stability of the shovel 100 to be transmitted to the management apparatus 200 on a predetermined app screen corresponding to the shovel stability viewer app. In response to the operation, the control device 310 transmits a request signal to the management apparatus 200 through the communications device 320. As a result, in response to the request signal from the portable terminal 300, the management apparatus 200 sequentially transmits the results of monitoring (the results of determination) as to the stability of the shovel 100 to the portable terminal 300 at predetermined control intervals. Accordingly, the user of the portable terminal 300 can check the stability of the shovel 100 from outside the shovel 100.

Furthermore, the portable terminal 300 may also be configured to be able to directly communicate with the shovel 100 through the communications device 320. In this case, the function of the dynamic unstable state determining part 301 and the function of the stabilization control part 302 may be transferred to the control device 310 of the portable terminal 300.

[Operations]

Next, operations of the shovel 100 according to this embodiment are described.

According to this embodiment, the controller 30 automatically moves the attachment in such a manner as to relatively decrease (not to relatively increase) the movement of the attachment. Specifically, the controller automatically moves the attachment in such a manner as to limit at least one of the amount of movement, movement speed, and movement acceleration of the attachment to a predetermined standard or below it.

This makes it possible to reduce anxiety caused to the operator, workers around, etc., while implementing automatic control of the attachment of the shovel 100. Therefore, it is possible to improve the safety of the shovel 100 in the case of automatically moving the attachment.

[Variations and Modifications]

An embodiment of the present invention is described in detail above. The present invention, however, is not limited to the specifically disclosed embodiment, and variations and modifications may be made without departing from the scope of the present invention.

For example, according to the above-described embodiment, the shovel 100 is configured to hydraulically drive all of various moving elements such as the lower traveling structure 1, the upper swing structure 3, the boom 4, the arm 5, and the bucket 6. The shovel 100, however, may also be configured to electrically drive one or more moving elements. That is, configurations, etc., disclosed in the above-described embodiment may be applied to hybrid shovels, electric shovels, etc.

What is claimed is:

1. A shovel comprising:
   a machine body, the machine body including
      a lower traveling structure; and
      an upper swing structure swingably mounted on the lower traveling structure;
   an attachment including a boom attached to the upper swing structure, an arm attached to a distal end of the boom, and an end attachment attached to a distal end of the arm;
   a hydraulic cylinder configured to drive the attachment;
   a controlling valve configured to discharge hydraulic oil in an oil chamber of the hydraulic cylinder to an outside; and
   processing circuitry configured to automatically move the attachment by controlling the controlling valve to discharge the hydraulic oil in the oil chamber of the hydraulic cylinder to the outside, and limit a degree of movement of the attachment to or below a predetermined standard by limiting an amount of the hydraulic oil discharged from the oil chamber of the hydraulic cylinder to the outside, in response to determining that the machine body of the shovel is in a predetermined unstable state.

2. The shovel as claimed in claim 1, further comprising:
   a detector configured to detect an amount of movement of the hydraulic cylinder in a direction in which the hydraulic cylinder moves when the hydraulic oil is discharged from the oil chamber of the hydraulic cylinder through the controlling valve,
   wherein the processing circuitry is configured to control the controlling valve to discharge the hydraulic oil in the oil chamber of the hydraulic cylinder to the outside, and decrease a flow rate of the hydraulic oil discharged from the oil chamber of the hydraulic cylinder to the outside as the amount of movement of the hydraulic cylinder increases.

3. The shovel as claimed in claim 1, wherein
   the hydraulic cylinder is a boom cylinder configured to drive the boom,
   the controlling valve is configured to discharge the hydraulic oil in a bottom-side oil chamber of the boom cylinder to the outside, and
   the processing circuitry is configured to limit a degree of movement of the boom to or below the predetermined standard by limiting an amount of the hydraulic oil discharged from the bottom-side oil chamber of the boom cylinder to the outside.

4. The shovel as claimed in claim 3, wherein the processing circuitry is configured to move the boom in a lowering direction in such a manner as to limit an amount of movement of the boom in the lowering direction to or below the predetermined standard.

5. The shovel as claimed in claim 3, wherein the processing circuitry is configured to control the controlling valve to move the boom in a lowering direction, and limit the degree of movement of the boom to or below the predetermined standard, when the attachment moves to discharge an object loaded in a bucket serving as the end attachment.

6. The shovel as claimed in claim 3, further comprising:
   a detector configured to detect an amount of movement of the boom cylinder in a lowering direction,
   wherein the processing circuitry is configured to control the controlling valve to discharge the hydraulic oil in the bottom-side oil chamber of the boom cylinder to the outside, and decrease a flow rate of the hydraulic oil discharged from the bottom-side oil chamber of the boom to the outside as the amount of movement of the boom cylinder increases.

7. The shovel as claimed in claim 6, further comprising:
   a control valve configured to control a supply of the hydraulic oil to and a discharge of the hydraulic oil from the boom cylinder; and
   a hydraulic oil retainer circuit provided in an oil passage between the control valve and the bottom-side oil chamber of the boom cylinder, and configured to block an outflow of the hydraulic oil from the bottom-side oil chamber of the boom cylinder to retain the hydraulic oil in the bottom-side oil chamber of the boom cylinder,
   wherein the controlling valve is configured to discharge the hydraulic oil in the bottom-side oil chamber of the boom cylinder to the outside when the hydraulic oil retainer circuit is disabled, and
   the processing circuitry is configured to disable the hydraulic oil retainer circuit and control the controlling valve to discharge the hydraulic oil in the bottom-side oil chamber of the boom cylinder to the outside, and decrease the flow rate of the hydraulic oil discharged from the bottom-side oil chamber of the boom to the outside by decreasing a degree of disabling the hydraulic oil retainer circuit as the amount of movement of the boom cylinder increases, in response to determining that the machine body is in the predetermined unstable state.

8. The shovel as claimed in claim 7, wherein
   the processing circuitry is configured to enable the hydraulic oil retainer circuit in an absence of an operation to lower the boom, and
   the controlling valve is provided in an oil passage downstream of the hydraulic oil retainer circuit relative to the bottom-side oil chamber of the boom cylinder.

9. The shovel as claimed in claim 6, wherein
   the detector is configured to output detection information regarding an operating state of the boom or the boom cylinder or regarding the amount of the hydraulic oil discharged from the bottom-side oil chamber of the boom cylinder to the outside, and
   the processing circuitry is configured to obtain the amount of movement of the boom cylinder in the lowering direction based on the detection information.

* * * * *